US012192391B2

(12) United States Patent
Nam et al.

(10) Patent No.: US 12,192,391 B2
(45) Date of Patent: Jan. 7, 2025

(54) MOBILE TERMINAL

(71) Applicant: LG ELECTRONICS INC., Seoul (KR)

(72) Inventors: Hosung Nam, Seoul (KR); Taeki Um, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 470 days.

(21) Appl. No.: 17/624,422

(22) PCT Filed: Jul. 4, 2019

(86) PCT No.: PCT/KR2019/008184
§ 371 (c)(1),
(2) Date: Jan. 3, 2022

(87) PCT Pub. No.: WO2021/002513
PCT Pub. Date: Jan. 7, 2021

(65) Prior Publication Data
US 2022/0417351 A1 Dec. 29, 2022

(51) Int. Cl.
*H04M 1/02* (2006.01)
*G06F 1/16* (2006.01)

(52) U.S. Cl.
CPC ........ *H04M 1/0216* (2013.01); *G06F 1/1681* (2013.01); *H04M 2201/38* (2013.01)

(58) Field of Classification Search
CPC ................. G06F 1/1681; H04M 1/0206–0233
See application file for complete search history.

(56) References Cited

U.S. PATENT DOCUMENTS

| 2006/0223595 A1* | 10/2006 | Kim | ...................... G06F 1/1637 |
| | | | 455/575.3 |
| 2008/0109734 A1* | 5/2008 | Castagno | ........... H04N 21/8166 |
| | | | 715/740 |
| 2009/0149226 A1* | 6/2009 | Watanabe | ............. H04M 1/022 |
| | | | 455/575.3 |

(Continued)

FOREIGN PATENT DOCUMENTS

| KR | 10-2011-0088735 A | 8/2011 |
| KR | 10-2012-0000197 A | 1/2012 |

(Continued)

*Primary Examiner* — Raymond S Dean
(74) *Attorney, Agent, or Firm* — Birch, Stewart, Kolasch & Birch, LLP

(57) ABSTRACT

Disclosed is a mobile terminal having a flexible display. The present application provides a mobile terminal comprising: a first body; a second body rotatably provided in the first body; a display which is provided on surfaces, of the first and second bodies, which face each other when the first and second bodies rotate, the display being configured to fold when the first and second bodies rotate toward each other and unfold when the first and second bodies rotate away from each other; a first hinge which rotatably couples the first and second bodies and is configured to revolve around first and second axes disposed between the first and second bodies; and a second hinge which rotatably couples the first and second bodies and is configured to interlock the first and second bodies in order to rotate the first and second bodies together.

18 Claims, 15 Drawing Sheets

(56) References Cited

U.S. PATENT DOCUMENTS

| | | | | |
|---|---|---|---|---|
| 2014/0111954 | A1* | 4/2014 | Lee | H04M 1/0268 |
| | | | | 361/749 |
| 2015/0009125 | A1* | 1/2015 | Kim | G06F 3/0483 |
| | | | | 345/156 |
| 2017/0142847 | A1* | 5/2017 | Park | H05K 5/0226 |
| 2018/0275725 | A1 | 9/2018 | Lin et al. | |
| 2018/0324964 | A1* | 11/2018 | Yoo | H05K 1/189 |
| 2020/0137907 | A1* | 4/2020 | Kang | G06F 1/1681 |

FOREIGN PATENT DOCUMENTS

| | | |
|---|---|---|
| KR | 10-1139866 B1 | 5/2012 |
| KR | 10-2019-0013992 A | 2/2019 |
| KR | 10-2019-0062107 A | 6/2019 |
| KR | 10-2019-0065972 A | 6/2019 |

* cited by examiner (a)

(b)

(a)

(b)

(a)

(b)

MOBILE TERMINAL

CROSS REFERENCE TO RELATED APPLICATIONS

This application is the National Phase of PCT International Application No. PCT/KR2019/008184, filed on Jul. 4, 2019, all of which is hereby expressly incorporated by reference into the present application.

TECHNICAL FIELD

The present application relates to a mobile terminal, and more particularly, to a foldable mobile terminal configured to adjust a size of an available display or screen.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

The functions of mobile terminals are being diversified. For example, there are functions such as data and voice communication, photography and video shooting via a camera, voice recording, playing music files via a speaker system, and outputting images or videos to a display unit. Some terminals may be equipped with an electronic game play function additionally or perform a multimedia player function. In particular, a recent mobile terminal may receive a multicast signal that provides visual content such as broadcasting and video or television programs. To perform such an extended function, the mobile terminal is basically connected to other devices or networks using various communication protocols and may provide a user with a ubiquitous computing environment. That is, mobile terminals have evolved into smart devices that enable connectivity to networks and ubiquitous computing.

Meanwhile, a flexible display that has sufficient elasticity and can be greatly deformed has been developed recently. Such a flexible display may be repeatedly folded or unfolded. A mobile terminal may be configured to have a foldable body that can be folded or unfolded, and the flexible display may be installed on such a body. Accordingly, when the body is folded or unfolded, the flexible display may also be folded or unfolded, and the mobile terminal may have a display or screen that is adjustable in size. Meanwhile, in order to implement a foldable body, a mechanical mechanism such as a hinge is required for example. However, the mechanical mechanism has a complex and large size for smooth folding and unfolding of the mobile terminal body. Accordingly, the mechanical mechanism for the foldable structure increases a size of a mobile terminal and may impose many restrictions on the design of the mobile terminal.

DISCLOSURE OF THE INVENTION

Technical Tasks

One technical task of the present disclosure is to provide a mobile terminal having a simple and compact foldable mechanism.

Another technical task of the present disclosure is to provide a mobile terminal having a foldable mechanism capable of performing folding and unfolding smoothly.

Technical Solutions

In one technical aspect of the present disclosure, provided is a mobile terminal, including a first body, a second body rotatably provided to the first body, a display provided to surfaces of the first and second bodies confronting each other when the first and second bodies rotate, the display configured to be folded when the first and second bodies rotate toward each other, the display configured to be unfolded when the first and second bodies rotate away from each other, a first hinge rotatably coupling the first and second bodies together and configured to revolve around first and second axes disposed between the first and second bodies, and a second hinge rotatably coupling the first and second bodies together and configured to interlock the first and second bodies to rotate the first and second bodies together.

Adjacent lateral parts of the first and second bodies may be spaced apart from each other in a prescribed interval. The first and second hinges may be disposed between the lateral parts of the first and second bodies. The first and second axes may be oriented side by side with the lateral parts between the adjacent lateral parts of the first and second bodies and spaced apart from each other in a prescribed interval.

The first hinge may include a first hinge arm coupled to the first body and configured to revolve around the first axis and a second hinge arm coupled to the second body and configured to revolve around the second axis. The first hinge arm may be spaced apart from the second hinge arm in a prescribed interval. The first and second hinge arms may be extended in a manner of overlapping each other.

The first and second hinge arms may be configured to adjust a horizontal relative interval between the first and second hinge arms. The first hinge arm may be configured to slide with respect to the second hinge arm and the second hinge arm may be configured to slide with respect to the second hinge.

The first hinge may include a supporter disposed between the first and second hinge arms and guiding revolutions of the first and second hinge arms. Specifically, the first and second hinge arms may include first and second pins, respectively and the supporter may include first and second grooves extended along revolution paths of the first and second hinge arms and receiving the first and second pins therein, respectively.

The second hinge may be configured to rotate the first and second bodies by a same angle simultaneously. The second hinge may include a third hinge arm coupled to the first body and configured to revolve around the first axis, a fourth hinge arm coupled to the second body and configured to revolve around the second axis, and an interlock mechanism coupled to the third and fourth hinge arms and configured to interlock the third and fourth hinge arms with each other.

The interlock mechanism may be disposed in a manner of being spaced apart from the third and fourth hinge arms in a vertical direction. The interlock mechanism may include a gear train connecting the third and fourth hinge arms to be driven simultaneously. Specifically, the interlock mechanism may include a first gear engaging with the third hinge arm, a second gear engaging with the fourth hinge arm, and at least one or more idle gears engaging with the first and second gears, respectively to rotate the first and second gears together. The third hinge arm may include a first rack gear engaging with the first gear and the fourth hinge arm may include a second rack gear engaging with the second gear.

The second hinge may include a holding mechanism configured to maintain relative positions of the first and second bodies. The holding mechanism may include a friction member provided to the third and fourth hinge arms to apply frictional force of a prescribed size to the third and fourth hinge arms.

The first and second hinges may be covered overall by the display. the mobile terminal may further include a cover provided between the first and second bodies and configured to cover the first and second hinges.

Advantageous Effects

A mobile terminal according to the present application includes a hinge assembly revolving around two different axes, and the hinge assembly may be simpler and more compact than other hinge assemblies. In addition, since the two-axis revolving hinge assembly has a simple structure, the mobile terminal may be smoothly folded or unfolded.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Embodiments described in the present specification include configurations to apply a flexible display to a mobile terminal. Yet, the principles and configurations of the described embodiments may identically apply to all display devices that use flexible displays. In particular, although the following embodiments are illustrated and described based on a mobile terminal, they may apply to all kinds of computing devices having foldable structures, e.g., laptops, tables and various smart devices, without substantial modifications.

Figure 1:
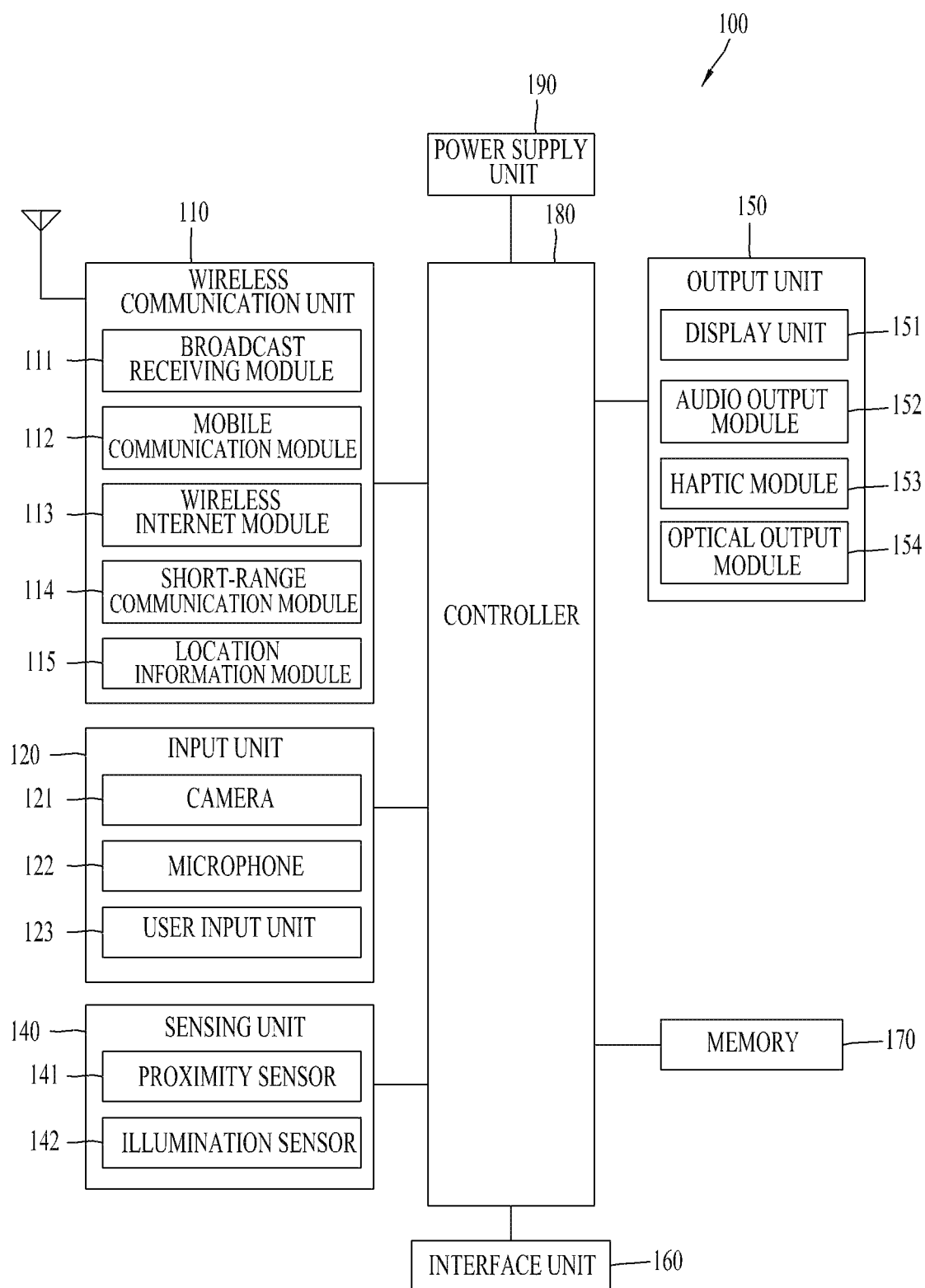
FIG. 1 is a block diagram showing the overall configuration of a mobile terminal according to the present application.

FIG. 1 is a block diagram showing the overall configuration of a mobile terminal according to the present application.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170. For example, the controller 180 may include a processor and other electronic parts supporting the processor. The processor and electronic parts may be mounted on a circuit board, thereby functioning as the controller 180.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
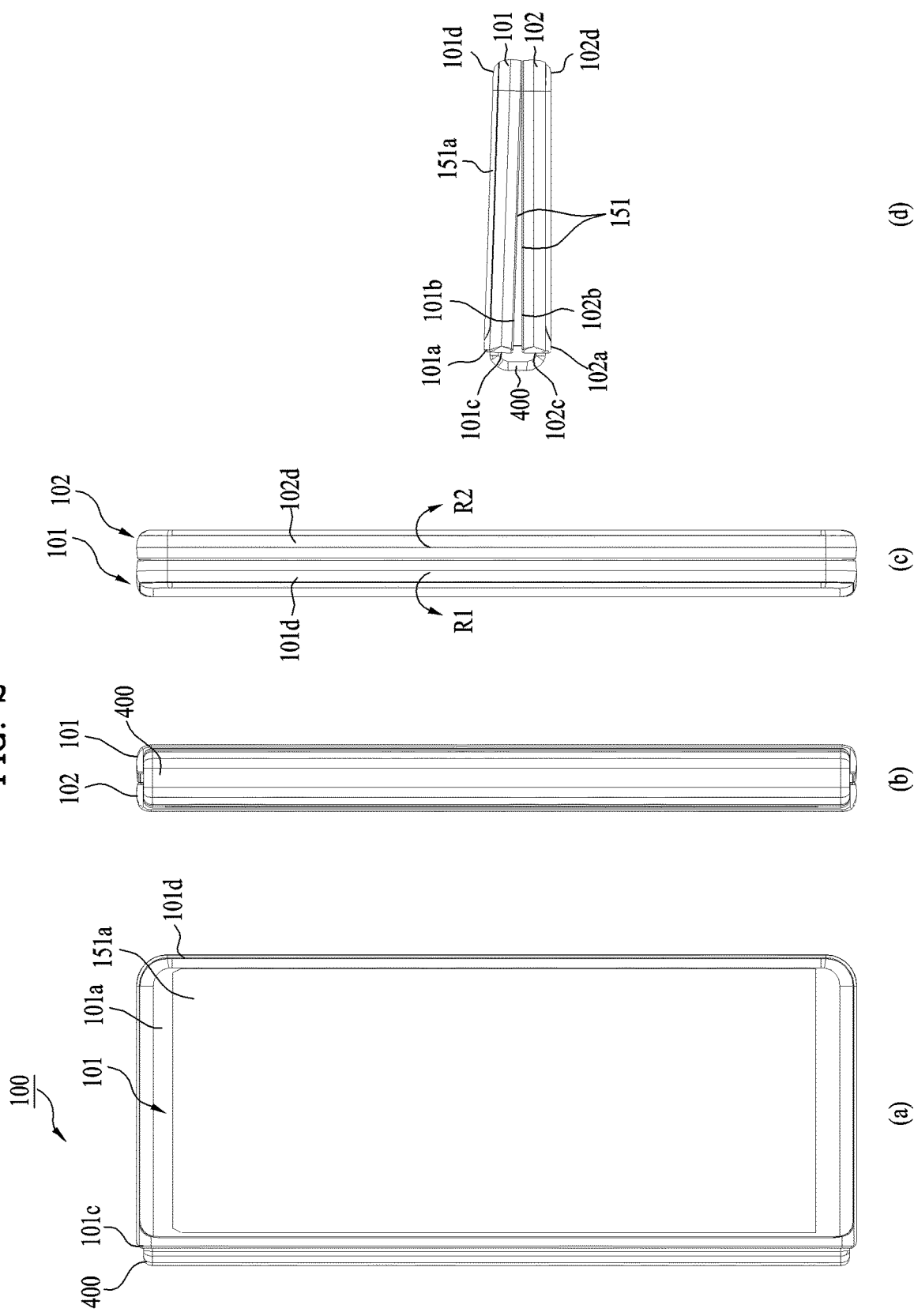
FIG. 2 includes front, lateral and bottom view diagrams showing a mobile terminal in a folded state according to the present application.
Figure 3:
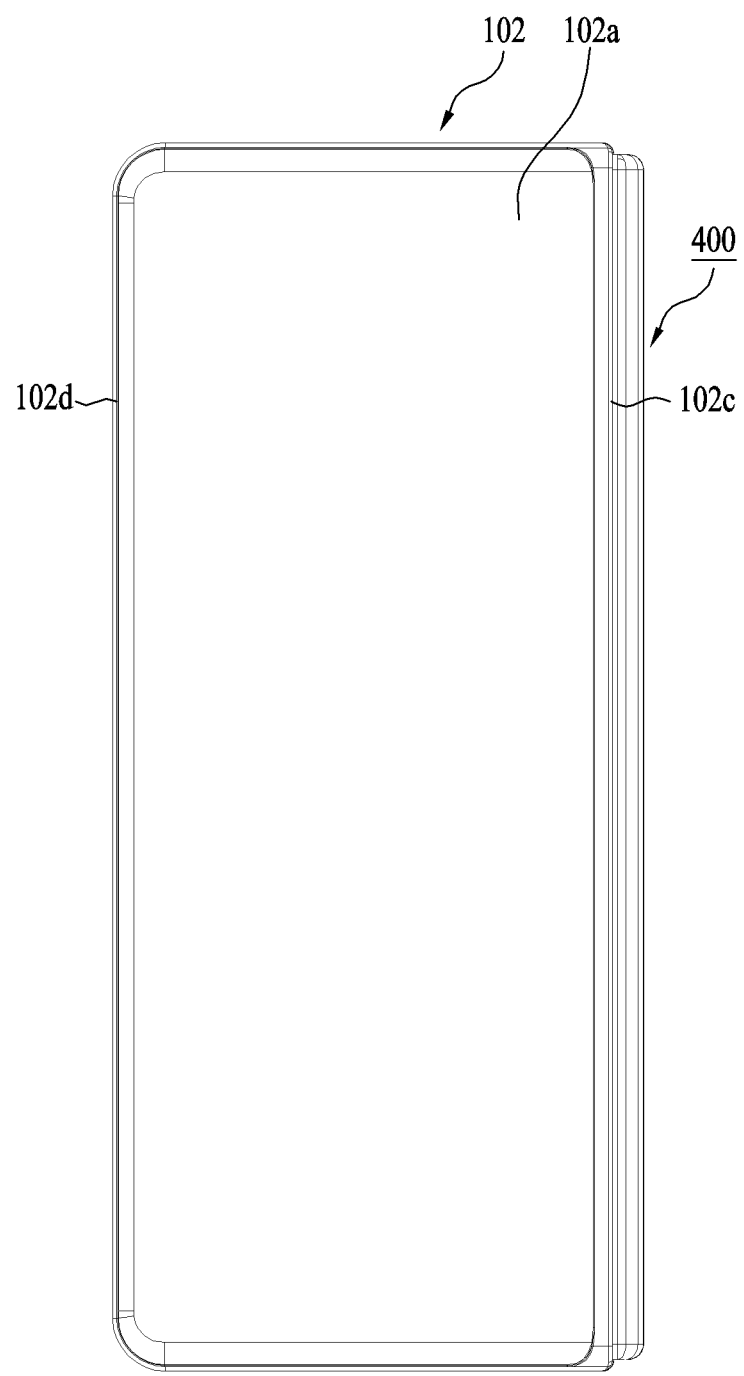
FIG. 3 is a rear view diagram showing a mobile terminal in a folded state.
Figure 4:
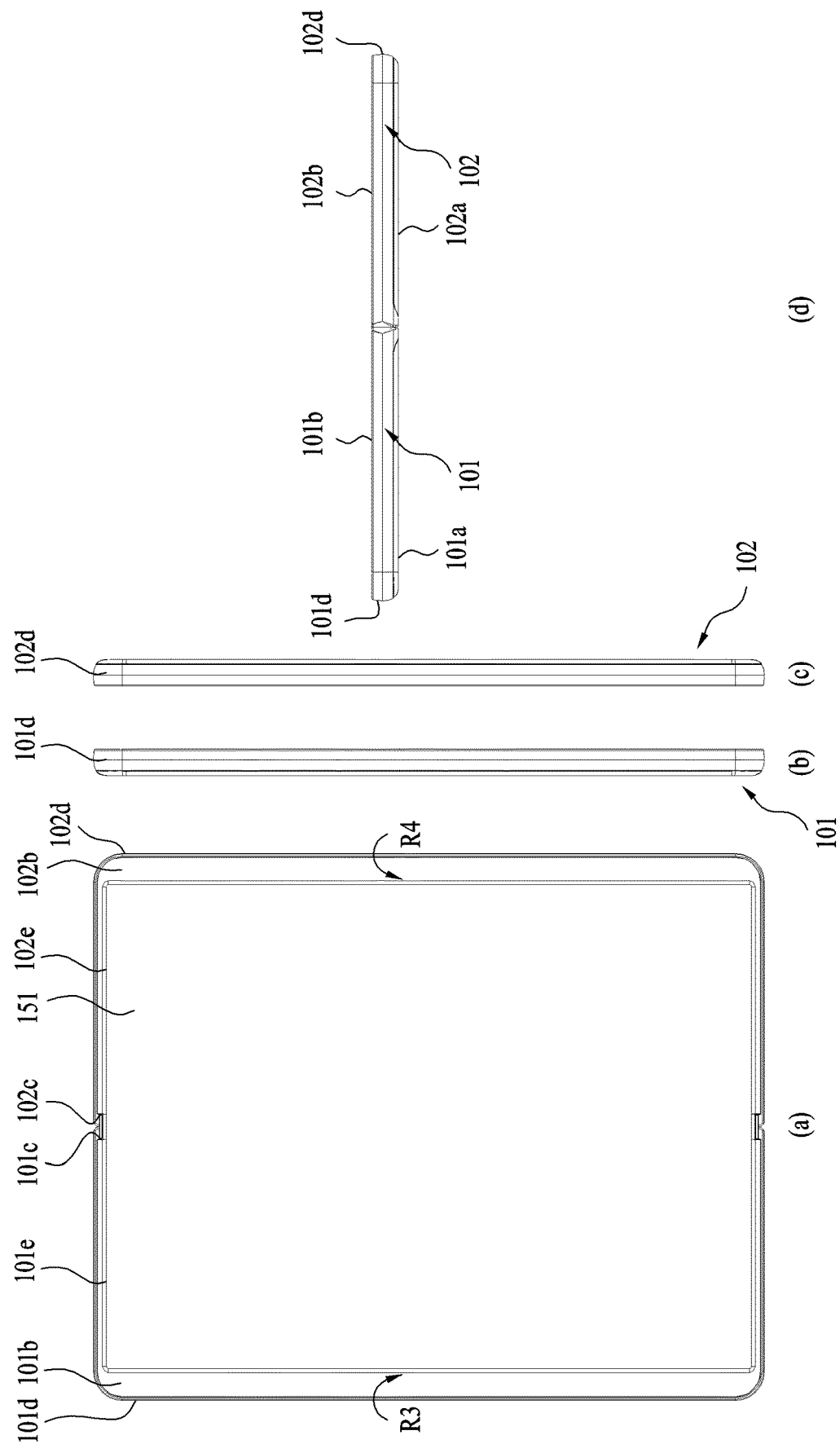
FIG. 4 includes front, lateral and bottom view diagrams showing a mobile terminal in an unfolded state according to the present application.
Figure 5:
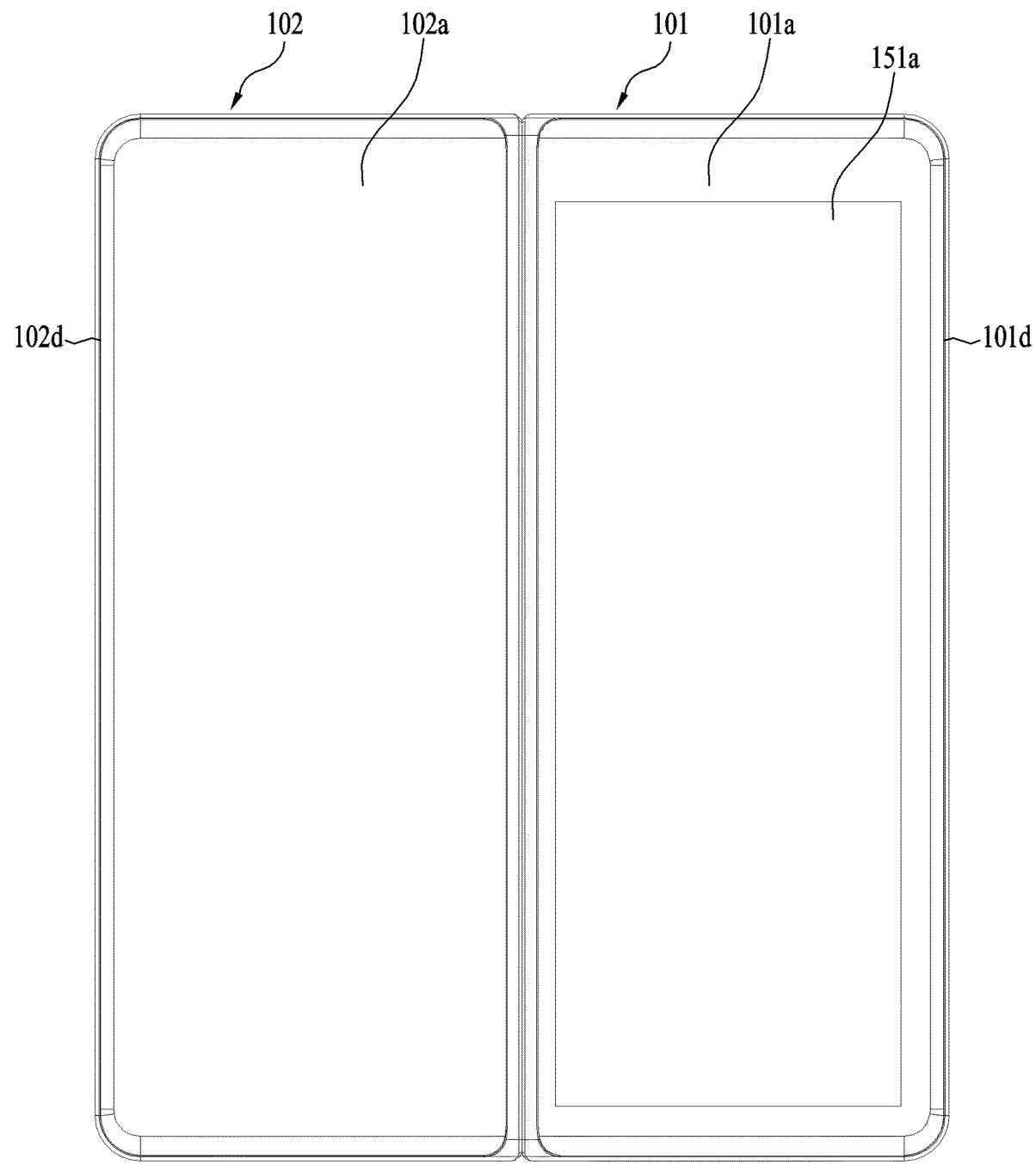
FIG. 5 is a rear view diagram showing a mobile terminal in an unfolded state.

FIG. 2 includes front, lateral and bottom view diagrams showing a mobile terminal in a folded state according to the present application. FIG. 3 is a rear view diagram showing a mobile terminal in a folded state. FIG. 4 includes front, lateral and bottom view diagrams showing a mobile terminal in an unfolded state according to the present application. FIG. 5 is a rear view diagram showing a mobile terminal in an unfolded state. With reference to these diagrams, the structure of the mobile terminal of the present application will be described. In the drawings showing a folded mobile terminal, FIG. 2(*a*) shows a front side, FIG. 2(*b*) and FIG. 2(*c*) show both lateral sides, and FIG. 2(*d*) shows a bottom side. In the drawings showing an unfolded mobile terminal, FIG. 4(*a*) shows a front side, FIG. 4(*b*) and FIG. 4(*c*) show both lateral sides, and FIG. 4(*d*) shows a bottom side.

A mobile terminal 100 may need to include two portions relatively moving to be folded or unfolded. Hence, as shown in the drawings, the mobile terminal 100 may include two bodies, i.e., a first body 101 and a second body 102, which are basically separated and independent from each other, to have a foldable structure. In addition, to be folded or unfolded, the first and second bodies 101 and 102 may be configured rotatable relatively.

First of all, the first body 101 may have various shapes, e.g., a rectangular shape shown in the drawing. The first body 101 may include a housing including a prescribed inner space, and the various components described in FIG. 1 may be installed or received in the housing. Meanwhile, the second body 102 may be rotatably provided to the first body 101. Namely, the second body 102 may be rotatably connected or coupled to the first body 101, thereby being configured rotatable relatively with respect to the first body 101. Likewise, the first body 101 may be rotatably connected or coupled to the second body 102, thereby being configured rotatable with respect to the second body 102. Namely, the first body 101 and the second body 102 may be configured rotatable with respect to each other. In addition, the second body 102 may have various shapes like the first body 101, and may have a shape corresponding to the first body 101, i.e., the same shape of the first body 101, among these shapes. If the second body 102 has the shape corresponding to the first body 101, as shown in FIG. 2 and FIG. 3, in a state that the mobile terminal 100 is folded, the mobile terminal 100 may form an exterior as if having a single body. For example, like the first body 101, the second body 102 may have a housing including a prescribed inner space, and the various components described in FIG. 1 may be installed or received in the housing.

Specifically, the first body 101 may include a first surface 101a and a second surface 101b disposed to confront the first surface 101a among various surfaces of the first body 101. When the mobile terminal 100 is folded or unfolded, i.e., when the first body 101 is rotated, the first surface 101a may not contact with or confront the second body 102. Yet, when the mobile terminal 100 is folded, the second surface 101b may confront the second body 102 or be disposed close to the second body 102. Likewise, the second body 102 may include a first surface 102a and a second surface 102b disposed to confront the first surface 102a among various surfaces of the second body 102. When the mobile terminal 100 is folded or unfolded, i.e., when the second body 102 is rotated, the first surface 102a may not contact with or confront the first body 101. Yet, when the mobile terminal 100 is folded, the second surface 102b may confront the first body 101 or be disposed close to the first body 101. Therefore, the first surfaces 101a and 102a may configure the exterior of the mobile terminal 100 when the mobile terminal 100 is folded or unfolded both. Namely, the first surfaces 101a and 102a may form an outer surface of the mobile terminal 100 all the time. For example, as shown in FIG. 2 and FIG. 3, in a state that the mobile terminal 100 is folded, the first surfaces 101a and 102a may form a front surface and a rear surface of the mobile terminal 100, respectively. In addition, as shown in FIG. 4 and FIG. 5, in a state that the mobile terminal 100 is folded, the first surfaces 101a and 102a may configure a same plane together and form a rear surface of the mobile terminal 100. On the other hand, when the mobile terminal 100 is folded, as shown in FIG. 2, the second surfaces 101b and 102b may confront each other and be then concealed in the folded mobile terminal 100. Meanwhile, when the mobile terminal 100 is unfolded, the second surfaces 101b and 102b may be unfolded and exposed to an outside of the mobile terminal 100, as shown in FIG. 4, thereby forming a front surface of the mobile terminal 100.

As shown in FIG. 4, a display 151 may be provided onto the second surfaces 101b and 102b. The display 151 is extended long across the second surfaces 101b and 102b, thereby providing a considerably large screen. Specifically, as shown in FIG. 4, the first body 101 may include a first seat 101e formed on the second surface 101b, and the second body 102 may include a second seat 102e formed on the second surface 102b. the first and second seats 101e and 102e may be recessed and form a single large seat in a manner of being connected to each other. Hence, the display 151 extended long may be stably received in the first and second seats 101e and 102e. Since the display 151 is provided onto the second surfaces 101b and 102b, when the mobile terminal 100 is unfolded, as shown in FIG. 4, the display 151 is unfolded as well, thereby being exposed from the mobile terminal 100 to provide a large screen to a user. In addition, when the mobile terminal 100 is folded, as shown in FIG. 2, the display 151 is folded as well, thereby being concealed in the mobile terminal 100. Meanwhile, in order to provide prescribed information to a user when the mobile terminal 100 is folded, the mobile terminal 100 may include an auxiliary display 151a. The auxiliary display 151a may be provided to one of the first surfaces 101a and 102a exposed even when the mobile terminal 100 is folded. For example, as shown in FIG. 2 and FIG. 5, the auxiliary display 151a may be disposed on the first surface 101a of the first body 101.

In addition, as well shown in FIG. 4, the first body 101 may have both lateral parts 101c and 101d. The second body 102 may have both lateral parts 102c and 102d as well. The lateral parts 101c and 102c may be disposed in a manner of being always adjacent to each other. The rest of the lateral parts 101d and 102d may be adjacent to or spaced apart from each other depending on a state (e.g., a folded state, an unfolded state) of the mobile terminal 100. The first and second bodies 101 and 102 may be connected to be relatively rotatable at the lateral parts 101c and 102c adjacent to each other all the time among those lateral parts. For such connection, a mechanical connection mechanism is necessary. Hence, to receive such a mechanical connection mechanism, the first and second bodies 101 and 102 may be spaced apart from each other in a prescribed interval at the lateral pars 101c and 102c adjacent to each other.

Under such a basic configuration, as shown in FIG. 2, the mobile terminal 100 may have a folded state, i.e., a first state. In the first state, the first and second bodies 101 and 102 may confront and contact with each other, whereby the mobile terminal may have a reduced size and exterior. In the first state, the display 151 is folded and concealed in the mobile terminal 100 but only the auxiliary display 151a may be exposed from the mobile terminal. In the first state, since the first and second bodies 101 and 102 contact with each other, the first state may become a closed state of the mobile terminal 100.

In the first state, as shown in FIG. 2, if the first body 101 and the second body 102 are rotated in opposite directions, i.e., a first direction R1 and a second direction R2, respectively, as shown in FIG. 4, the first body 101 and the second body 102 may be rotated to go away from each other, i.e., to be unfolded and disposed in the same plane (i.e., flush with each other). Namely, the first body 101 and the second body 102 may configure a single flush body. Simultaneously, the display 151 may be unfolded and a single enlarged screen may be formed on the unfolded first and second bodies 101 and 102. Thus, the unfolded state of the mobile terminal 100 may be referred to as a second state in comparison to the aforementioned first state. In the second state, since the first body 101 and the second body 102 are rotated to be spaced apart from each other, the second state may be referred to as an open state of the mobile terminal 100.

On the other hand, in the second state, as shown in FIG. 4, if the first body 101 and the second body 102 are rotated in opposite directions, e.g., a third direction R3 and a fourth direction R4, respectively, the mobile terminal may return to the aforementioned first state. Specifically, as shown in FIG. 2, the first body 101 and the second body 102 may be rotated toward each other to get closer (i.e., folded) and then contact with each other. Simultaneously, the display 151 may be folded and concealed in the mobile terminal 100.

For the aforementioned operations of the first body 101 and the second body 102, a connection mechanism of rotatably connecting them together is necessary. As such a connection mechanism, the mobile terminal 100 of the present application may include first and second hinges 200 and 300. The first hinge 200 among such hinges will be described with reference to the accompanying drawings as follows.

Figure 6:
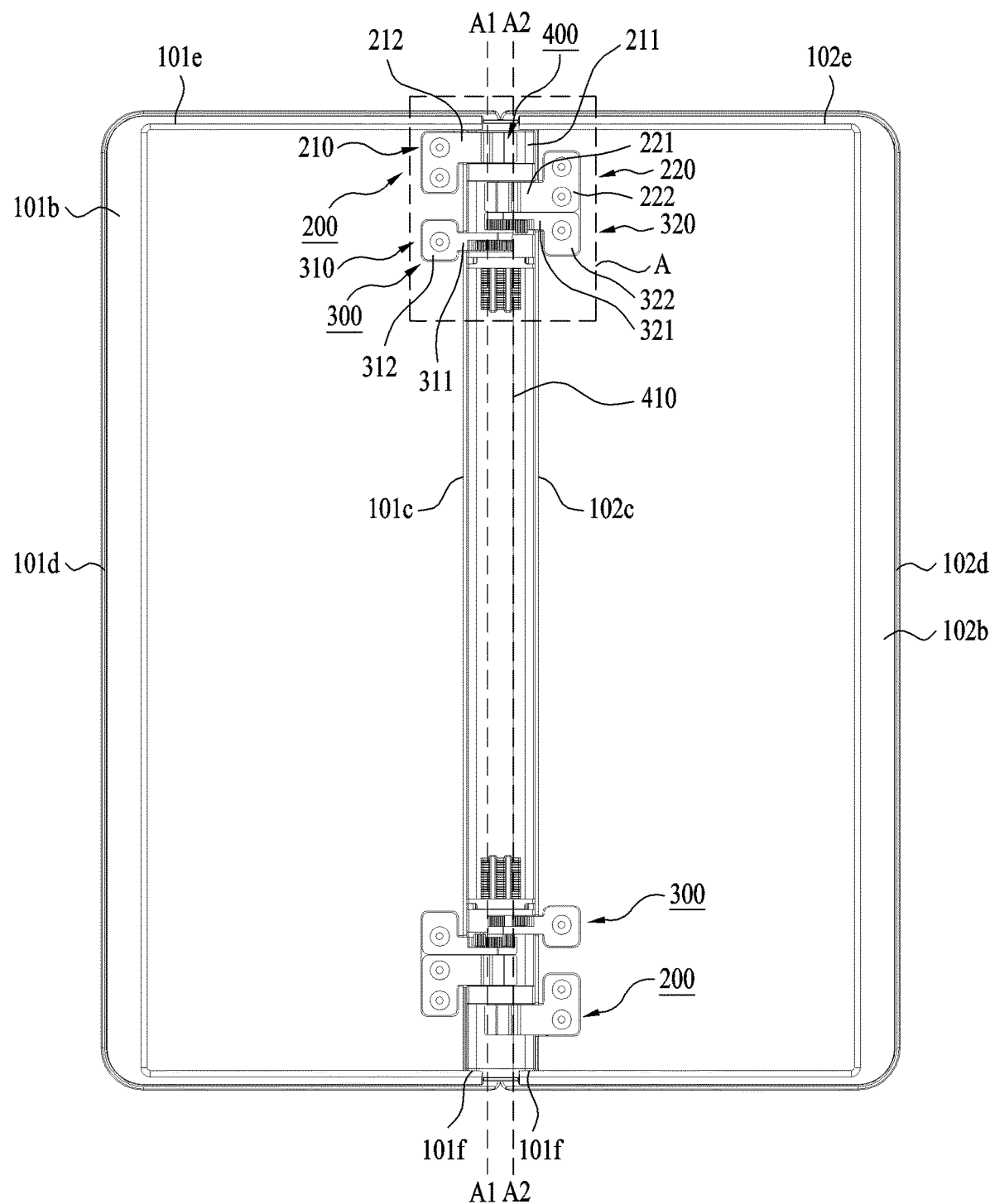
FIG. 6 is a front view diagram showing hinges included in a mobile terminal in an unfolded state.
Figure 7:
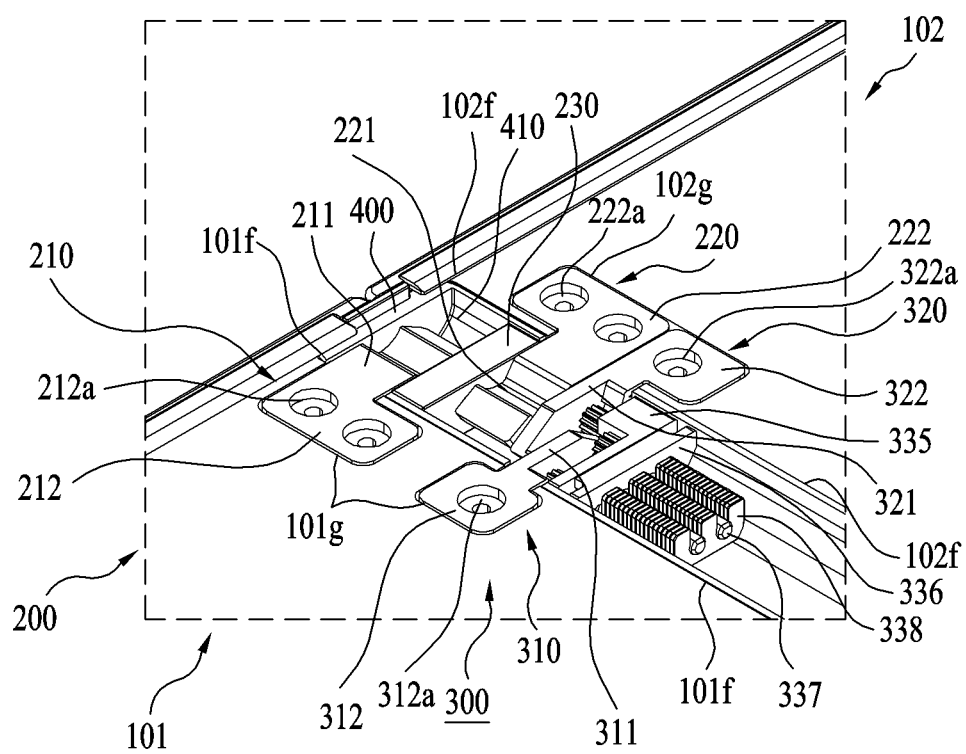
FIG. 7 is a partially enlarged perspective diagram showing a region A of FIG. 6.
Figure 8:
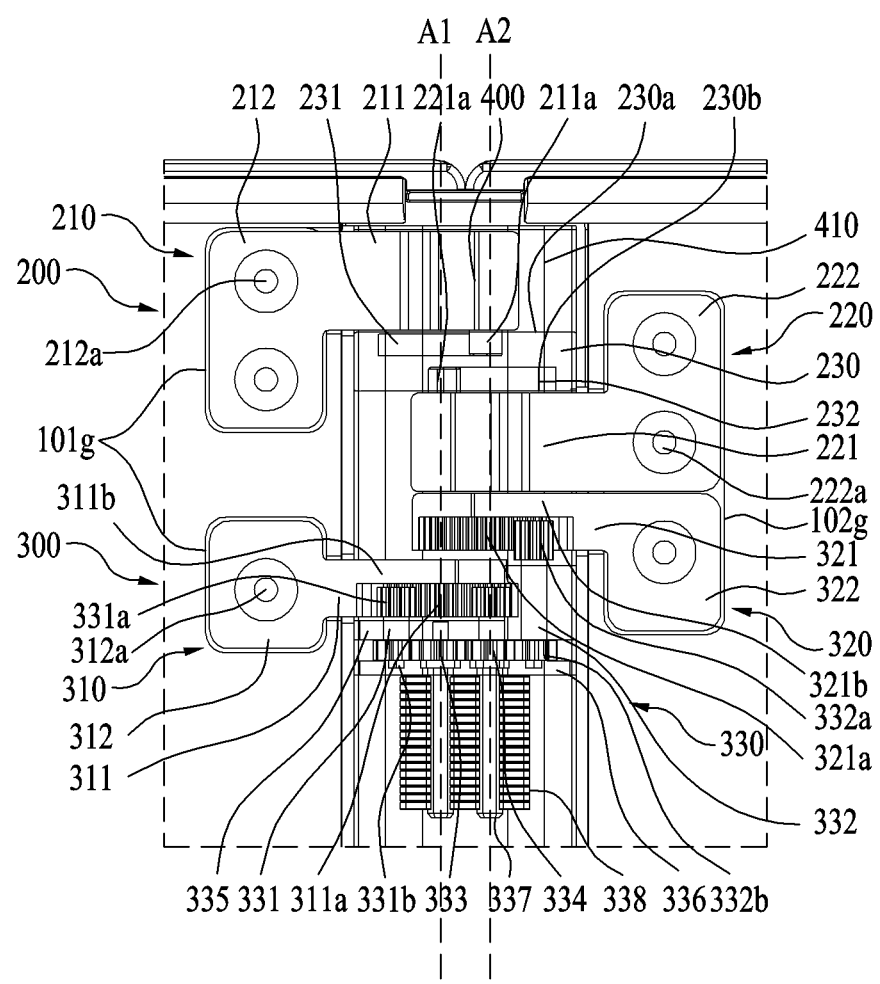
FIG. 8 is a partially enlarged layout showing a region A of FIG. 6.
Figure 9:
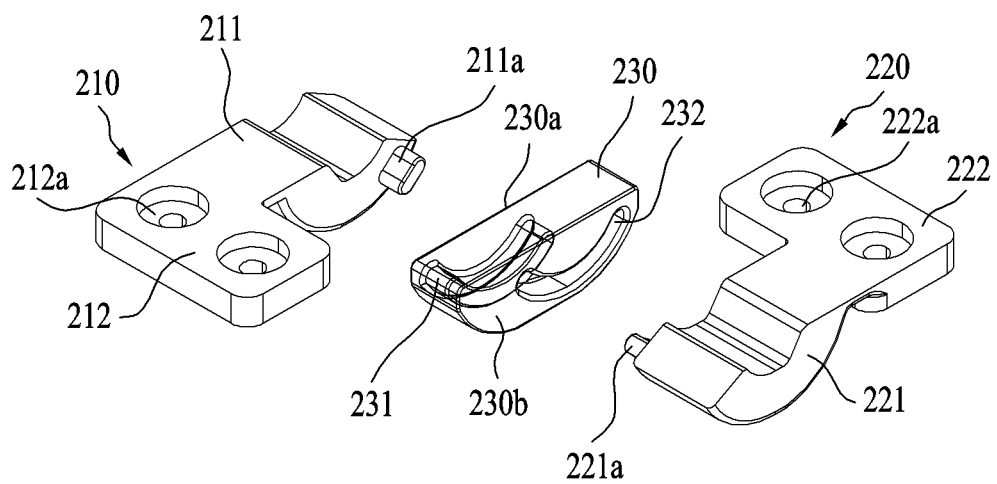
FIG. 9 is an exploded perspective view diagram showing a first hinge of a mobile terminal.
Figure 10:
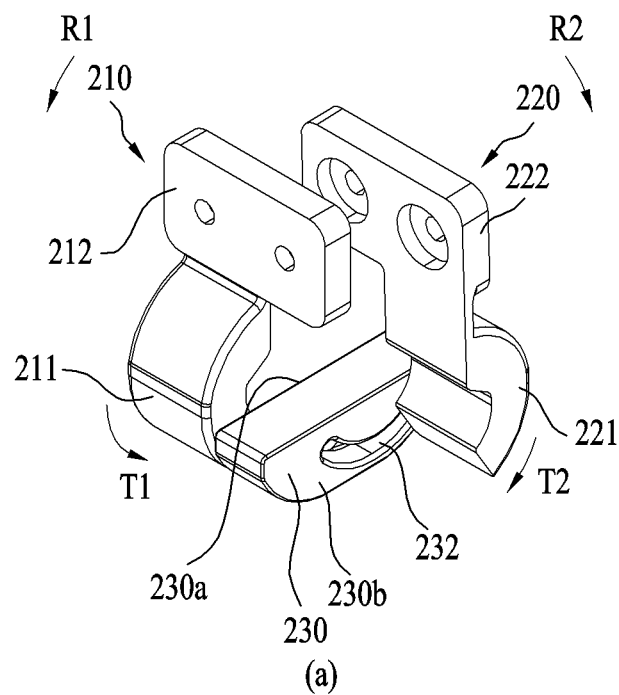
FIG. 10 includes perspective view diagrams showing folding and unfolding of a first hinge.
Figure 10:
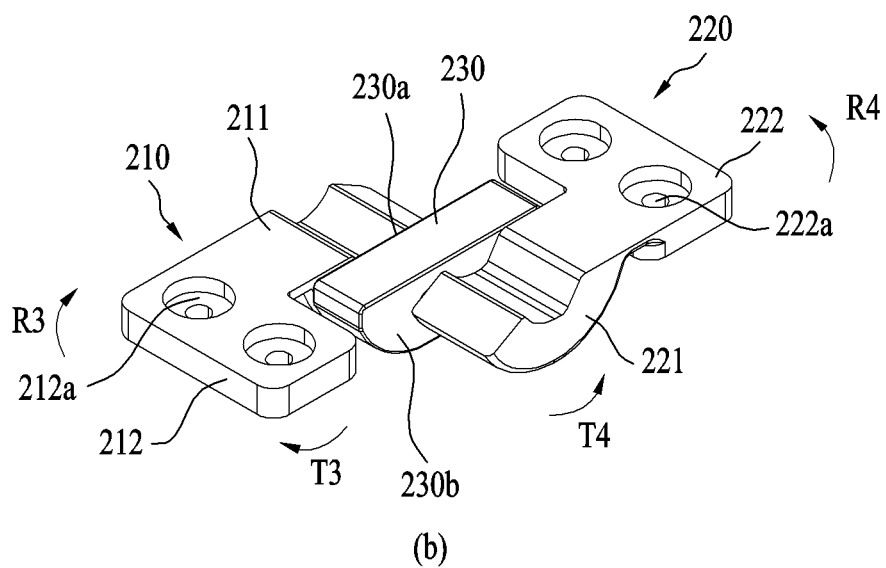
Figure 11:
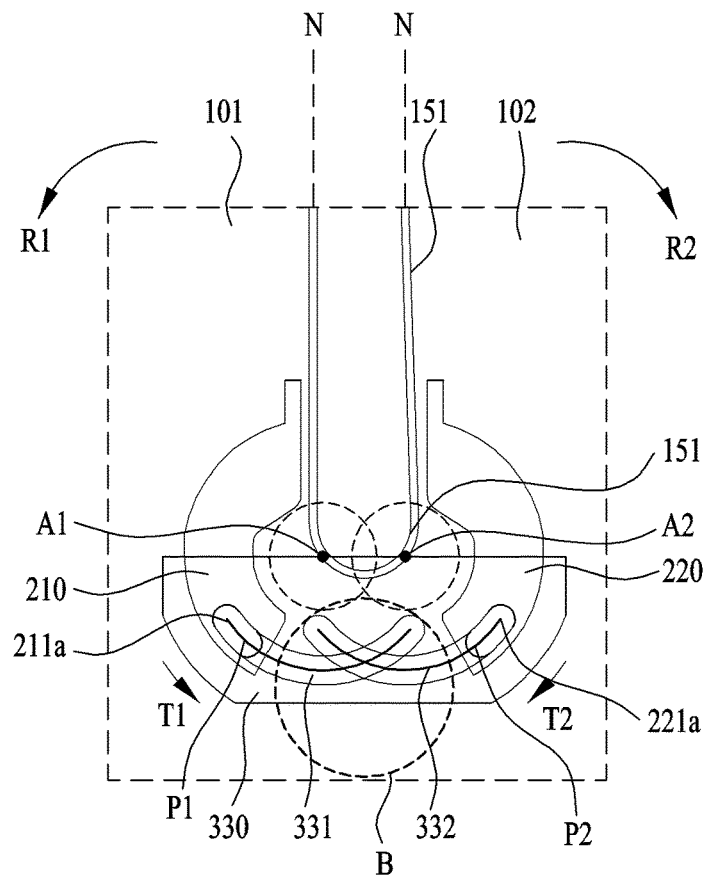
FIG. 11 includes schematic diagrams showing motions of a first hinge in folding and unfolding.
Figure 11:
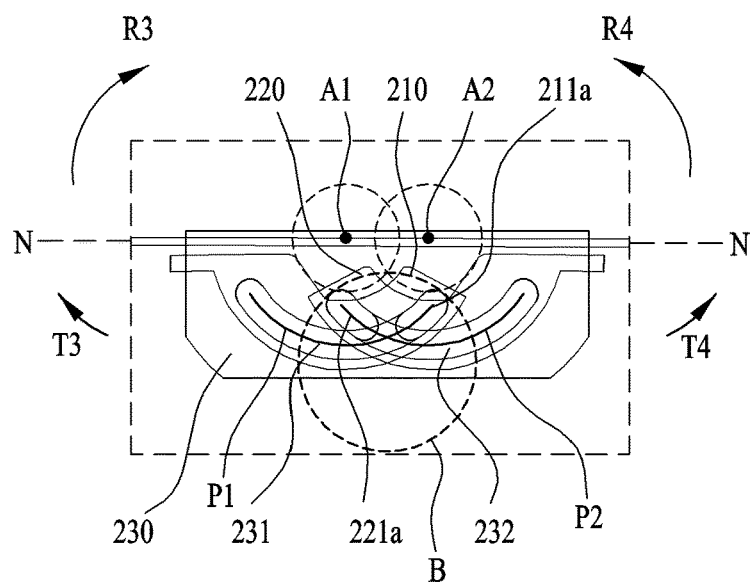

FIG. 6 is a front view diagram showing hinges included in a mobile terminal in an unfolded state. FIG. 7 is a partially enlarged perspective diagram showing a region A of FIG. 6. FIG. 8 is a partially enlarged layout showing a region A of FIG. 6. FIG. 9 is an exploded perspective view diagram showing a first hinge of a mobile terminal. FIG. 10 includes perspective view diagrams showing folding and unfolding of a first hinge. FIG. 11 includes schematic diagrams showing motions of a first hinge in folding and unfolding. Particularly, FIG. 6 shows a state that the display 151 is removed to provide a better view of the first and second hinges 200 and 300.

The first hinge 200 may include a first hinge arm 210 and a second hinge arm 220 provided to the first body 101 and the second body 102, respectively. As basically shown in the drawings, the first hinge 200 is disposed between the first and second bodies 101 and 102, thereby connecting or coupling them together rotatably with respect to each other. Specifically, the first hinge 200 is disposed between adjacent lateral parts or side edges 101c and 102c of the first and second bodies 101 and 102 and may be configured to connect or couple them together rotatably.

The first hinge arm 210 of the first hinge 200 may be configured to be coupled to the first body 101. The first hinge arm 210 may include a body 211 and a bracket 212 provided to the body 211. The bracket 212 may be coupled to the first body 101, and more particularly, to the second surface 101b of the first body 101 to couple the first hinge arm 210 to the first body 101. Specifically, the bracket 212 may include a fastening hole 212a and may be coupled to the first body 101 using the fastening hole 212a and a fastening member. The first body 101 may further include a recess 101g additionally formed in the second surface 101b thereof, and more particularly, in the seat 101e, whereby the bracket 212 may be received in the recess 101g. Therefore, as shown in the drawings, the bracket 212 is not projected from the second surface 101b of the first body 101, and more particularly, from the seat 101e, thereby avoiding interfering with the display 151 received in the seat 101e.

The second hinge arm 220 may be configured to be coupled to the second body 102. Similarly to the first hinge arm 210, the second hinge arm 220 may include a body 221 and a bracket 222 provided to the body 221. The bracket 222 may be coupled to the second body 102, and more particularly, to the second surface 102b of the second body 102 to couple the second hinge arm 220 to the second body 102. Specifically, the bracket 222 may include a fastening hole 222a and may be coupled to the second body 102 using the fastening hole 222a and a fastening member. The second body 102 may further include a recess 102g additionally formed in the second surface 102b thereof, and more particularly, in the seat 102e, whereby the bracket 222 may be received in the recess 102g. Therefore, as shown in the drawings, the bracket 222 is not projected from the second surface 102b of the second body 102, and more particularly, from the seat 102e, thereby avoiding interfering with the display 151 received in the seat 102e.

The body 211 of the first hinge arm 210 may include a rod member extended long from the bracket 212. Specifically, the body 211 may be extended from the bracket 212 toward the second body 102 (or the lateral part 102c thereof), and may traverse a space between the first and second bodies 101 and 102 in a horizontal direction, i.e., a lateral direction of the first and second bodies 101 and 102. Likewise, the body 221 of the second hinge arm 220 may include a rod member extended long from the bracket 222. The body 221 may be extended from the bracket 222 toward the first body 101 (or the lateral part 101c thereof), and may traverse a space between the first and second bodies 101 and 102 in a horizontal direction, i.e., a lateral direction of the first and second bodies 101 and 102. Theses bodies 211 and 221 may be formed separately from the brackets 212 and 222 and coupled to the brackets 212 and 222. As shown in the drawing, these bodies 211 and 221 may be integratedly formed with the brackets 212 and 222, respectively.

In addition, as shown in the drawings, the body 211 of the first hinge arm 210 may be formed in a manner of being curved or arched outwardly from the mobile terminal 100 or the first and second bodies 101 and 102. As described above, since the first hinge arm 210 is fixed to the first body 101, when the first body 101 is rotated, the first hinge arm 210 may move together and the curved body 211 thereof may revolve (or orbit or turn) around a prescribed first axis A1, which is well shown in FIG. 11. As shown in the drawing, such revolution may be performed along a first path P1 formed around the first axis A1 in a manner of being curved. Namely, the body 211 of the first hinge 210 may revolve around the first axis A1 along the first path P1. Meanwhile, similarly to the first hinge arm 210, the body 221 of the second hinge arm 220 may be formed in a manner of being curved or arched outwardly from the mobile terminal 100 or the first and second bodies 101 and 102. Since the second hinge arm 220 is fixed to the second body 102, when the second body 102 is rotated, the second hinge arm 220 may move together and the curved body 211 thereof may revolve around a prescribed second axis A2, which is well shown in FIG. 11. As shown in the drawing, such revolution may form a second path P2 formed around the second axis A2 in a manner of being curved. Namely, the body 221 of the second hinge 220 may revolve around the second axis A2 along the second path P2. Thus, the first and second hinge arms 210 and 220, and more particularly, the bodies 211 and 221 thereof revolve between the first and second bodies 101 and 102, and their paths P1 and P2 may not be formed long while allowing the first and second bodies 101 and 102 to rotate sufficiently. Therefore, as the first and second hinge arms 210 and 220 are configured to revolve around the first and second axes A1 and A2, respectively, the first hinge 200 may have a compact size, whereby the mobile terminal 100 can become compact.

The first and second axes A1 and A2 may be substantially formed of physical members or configured at prescribed portions of the mobile terminal 100 as a sort of virtual axes. For example, as shown in the drawings, the mobile terminal 100 includes the first and second axes A1 and A2 as virtual axes, or may be modified to include physical axes. These first and second axes A1 and A2 may be disposed at the same position. Namely, the first and second axes A1 and A2 configure a single axis, and the first and second hinge arms 210 and 220 may revolve around such a single axis. However, since the first and second bodies 101 and 102 have considerable thickness, if the first and second hinge arms 210 and 220 are configured to revolve around a single axis, when the mobile terminal 100 is folded, the first and second bodies 101 and 102 may be gapped instead of contacting with each other uniformly. For this reason, in order for the first and second bodies 101 and 102 to touch each other uniformly when the mobile terminal 100 is folded, the first and second axes A1 and A2 may be spaced apart from each other in a prescribed interval. In addition, for the smooth rotation of the first and second bodies 101 and 102, as well shown in FIG. 6 and FIG. 8, the first and second axes A1 and A2 may be extended and oriented in a vertical direction. Namely, the first and second axes A1 and A2 may be oriented side by side with the lateral parts 101c and 102c adjacent to each other. In addition, since the first and second hinge arms 210 and 220, and more particularly, the bodies 211 and 221 thereof are configured to revolve between the first and second bodies 101 and 102, they may be disposed between the first and second bodies 101 and 102, i.e., the adjacent lateral parts 101c and 102c thereof. Furthermore, as well shown in FIG. 11, the first and second axes A1 and A2 may be configured to be disposed on a neutral surface N of the display 151. Specifically, as the first and second axes A1 and A2 may be determined according to the structures of the first and second hinge arms 210 and 220, the first and second axes A1 and A2 may be designed to be disposed on the neutral surface N by controlling curvatures of the first and second hinge arms 210 and 220, and more particularly, curvatures of the bodies 211 and 221 thereof. When the mobile terminal 100 is folded, the display 151 is folded as well, whereby serious deformation may be generated from such a folded portion. However, if the first and second axes A1 and A2 are disposed on the neutral surface N, the curvature of the folded portion of the display 151 is reduced geometrically, thereby mitigating such deformation.

In addition, as well shown in FIG. 7 and FIG. 8 as well as FIG. 6, the first hinge arm 210, i.e., the body 211 may be spaced apart from the second hinge arm 220, i.e., the body 221 in a vertical direction at a prescribed interval. Hence, the first hinge arm 210, i.e., the body 211 and the second hinge arm 220, i.e., the body 221 may be extended in a horizontal direction, i.e., in a lateral direction of the bodies 101 and 102 in a length enough to enable rotations required for the first and second bodies 101 and 102 without interfering with each other. Specifically, owing to such sufficient extension, the first hinge arm 210, i.e., the body 211 and the second hinge arm 220, i.e., the body 221 may be side by side with each other in a horizontal direction but may overlap each other in a vertical direction. In addition, as well shown in FIG. 11, owing to the overlapping between the first and second hinge arms 210 and 220, the first and second paths P1 and P2 formed by them may be formed in sufficient lengths but may overlap each other in the vertical direction despite being side by side with each other in the horizontal direction. Owing to such disposition, even in a smaller space between the first and second bodies 101 and 102, the first and second hinge arms 210 and 220 may form the paths P1 and P2 in sufficient lengths that meet the required rotations of the bodies 101 and 102. Therefore, the first hinge 200 may become compact while showing the required performance, whereby a size of the mobile terminal 100 including the first hinge 200 inside can be reduced.

In addition, as described above, the first and second hinge arms 210 and 220 may be fixed to the first and second bodies 101 and 102 and rotate together with them. On the other hand, the first and second hinge arms 210 and 220 may be configured to be relatively movable to perform revolving motions. Namely, the first and second hinge arms 210 and 220 may be configured not to move relatively with respect to the first and second bodies 101 and 102 but to perform relative motions with respect to each other. Eventually, the first and second hinge arms 210 and 220 may be coupled to be relatively movable to each other only. Specifically, as well shown in FIG. 11, by the revolution according to the first path P1, the first hinge arm 210 (i.e., the body 211) may be configured to move toward or away from the second hinge arm 220 (or the second body 102). In addition, by the revolution according to the second path P2, the second hinge arm 210 (or the body 221) may be configured to move toward or away from the first hinge arm 210 (or the first body 101). Considering such motions, the first hinge arm 210 (i.e., the body 211) may be configured slidable in a horizontal direction with respect to the second hinge arm 220, and the second hinge arm 220 (i.e., the body 221) may be configured slidable in a horizontal direction with respect to the first hinge arm 210. Namely, the first hinge arm 210 may be slidably coupled to the second hinge arm 220, and the second hinge arm 220 may be slidably coupled to the first hinge arm 210. Eventually, such a slide motion may change a horizontal interval or distance between the first and second hinge arms 210 and 220. On the other hand, by the slide motion, the overlap length of the first and second hinge arms, i.e., the bodies 211 and 221 thereof may be changed. The change of the horizontal interval or overlap length may be allowed without restricting the curvature change and deformation of the mobile terminal 100, generated from folding or unfolding the mobile terminal 100. For example, referring to FIG. 11(a), in order to fold the mobile terminal 100, a great curvature and tension should be generated from a portion B at which the mobile terminal 100 is folded. Regarding this, as shown in the drawing, a distance between the first and second hinge arms 210 and 220, i.e., the bodies 211 and 221 may be increased by the rotations of the first and second bodies 101 and 102 in third and fourth directions R3 and R4 for the folding, and a great curvature and tension at the folded portion B may be allowed. On the other hand, referring to FIG. 11(b), in order to unfold the mobile terminal 100, curvature decrease and relative compression should be generated from a portion B at which the mobile terminal 100 is unfolded. Regarding this, as shown in the drawing, a distance between the first and second hinge arms 210 and 220, i.e., the bodies 211 and 221 may be decreased by the rotations of the first and second bodies 101 and 102 in the first and second directions R1 and R2 for the unfolding, and the curvature decrease and compression at the unfolded portion B may be enabled. Therefore, the first and second hinge arms 210 and 220 may be configured to adjust a horizontal relative distance and interval between the first and second bodies 101 and 102 according to the rotation directions of the first and second bodies 101 and 102, thereby enabling the smooth rotations of the first and second bodies 101 and 102.

In addition, in order to rotatably connect the first and second bodies 101 and 102, the first and second hinge arms 210 and 220 need to be connected together. For such mutual connection, the bodies 211 and 221 of the first and second hinge arms may be directly coupled to each other to enable the aforementioned revolving motion. Moreover, as well shown in FIGS. 7 to 9, they may be coupled to enable a motion via a member inserted in-between, and more particularly, the slide motion described above. As the inserted member, the first hinge 200 may include a supporter 230 disposed between the first and second hinge arms, i.e., the bodies 211 and 212 thereof. The supporter 230a may be formed of a panel member of a prescribed thickness. The supporter 230 may include surfaces 230a and 230b confronting the first and second hinges 210 and 220, i.e., the bodies 211 and 221 thereof. The surface 230a may confront a lateral portion of the body 211, i.e., a bottom surface thereof in the drawing, and the surface 230b may confront a lateral portion of the body 221, i.e., a top surface thereof according to the orientation of the drawing. Furthermore, the surfaces 230a and 230b may be spaced apart from the confronted surfaces of the first and second hinge arms 210 and 220 in prescribed intervals, or they, on the other hand, may contact with the surfaces of the first and second hinge arms 210 and 220. If the surfaces 230a and 230b contact with the first and second hinge arms 210 and 220, the hinge arms 210 and 220 are provided with frictional force, whereby the first and second hinge arms 210 and 220 and the first and second bodies 101 and 102 connected thereto can be prevented from moving rapidly. Furthermore, the first and second hinge arms 210 and 220, i.e., the bodies 211 and 221 thereof may include first and second pins 211a and 221a extended toward the supporter 230, respectively. The supporter 230 may include first and second grooves 231 and 232 receiving the first and second pins 211a and 221a, respectively. The first and second grooves 231 and 232 may be extended along the preset revolution paths P1 and P2 of the first and second hinge arms 210 and 220, respectively. As shown in the drawings, the first and second grooves 231 and 232 may overlap each other in a vertical direction like the revolution paths P1 and P2. Therefore, the supporter 230 couples the first and second hinge arms 210 and 220 together to be relatively slidable to each other, and may guide the revolution of the first and second hinge arms 210 and 220 smoothly. The first and second grooves 231 and 232 may be configured to have the same lengths and shapes of the preset paths P1 and P2, respectively. Therefore, the first and second grooves 231 and 232 may be configured to limit the motions of the first and second pins 211a and 221a, i.e., the first and second hinge arms 210 and 220, respectively, thereby preventing excessive rotations of the first and second bodies 101 and 102 during the folding or unfolding of the mobile terminal 100. For this reason, the supporter 230 may be configured to limit the excessive motions of the hinge arms 210 and 220 and the bodies 101 and 102.

Under the above configuration, referring to FIG. 11(a) together with FIGS. 1 to 10, in the first state that the mobile terminal 100 is folded, if the first and second bodies 101 and 102 are oppositely rotated in the first and second directions R1 and R2, respectively, the first and second hinge arms 210 and 220 may move in first and second revolving directions T1 and T2 together with the first and second bodies 101 and 102, respectively. Specifically, the first and second hinge arms 210 and 220 revolve around the first and second axes A1 and A2 in the first and second revolving directions T1 and T2 along the paths P1 and P2, respectively, and may be stably supported and guided by the first and second grooves 231 and 232 of the supporter 230 and the first and second pins 211a and 221a during such revolutions, respectively. As shown in FIG. 11(b), the first and second hinge arms 210 and 220 may move closer to each other by the revolutions, whereby a relative distance therebetween may be decreased. On the other hand, the first and second bodies 101 and 102 rotate to move away from each other and may be disposed in the same plane (i.e., to be flush with each other) while entering the second state of being unfolded. As the relative distance between the first and second hinge arms 210 and 220 decreases, as shown in FIGS. 6 to 8, the unfolded first and second hinge arms 210 and 220 may become flush with the first and second bodies 101 and 102 likewise, whereby the mobile terminal 100 may become compact. In addition, since the relative distance between the first and second hinge arms 210 and 220 decreases, the curvature decrease and compression at the folded portion B in the second state can be absorbed, whereby the mobile terminal 100 may be smoothly switched to the second state.

On the other hand, as shown in FIG. 11(b), in the second state that the mobile terminal 100 is unfolded, if the first and second bodies 101 and 102 are oppositely rotated in the third and fourth directions R3 and R4, respectively, the first and second hinge arms 210 and 220 may move in third and fourth revolving directions T3 and T4 together with the first and second bodies 101 and 102, respectively. Specifically, the first and second hinge arms 210 and 220 revolve around the first and second axes A1 and A2 in the third and fourth revolving directions T3 and T4 along the paths P1 and P2, respectively, and may be stably supported and guided by the first and second grooves 231 and 232 of the supporter 230 and the first and second pins 211a and 221a during such revolutions, respectively. As shown in FIG. 11(a), the first and second hinge arms 210 and 220 may move away from each other by the revolutions, whereby a relative distance therebetween may be increased. On the other hand, the first and second bodies 101 and 102 rotate to move closer to each other and may enter the first state of being folded. As the relative distance between the first and second hinge arms 210 and 220 increases, the curvature increase and the relative tension at the folded portion B in the first state may be allowed instead of being restricted, whereby the mobile terminal 100 may be smoothly switched to the first state.

As described above, the first hinge 200 may be configured to perform mechanical motions required for the first and second bodies 101 and 102, and the mobile terminal 100 may perform the intended folding and unfolding of the mobile terminal 100 smoothly using the first hinge 100 only. Nonetheless, if rotations of the first and second bodies 101 and 102 are synchronized with each other, the folding and unfolding of the mobile terminal 100 may be achieved more stably. For this reason, the mobile terminal 100 of the present application may additionally include a second hinge 300 as a connection mechanism, and the second hinge 300 may be configured to interlock the first and second bodies 101 and 102, and more particularly, rotations thereof with each other. The second hinge 300 will be described with reference to the relevant drawings as follows.

Figure 12:
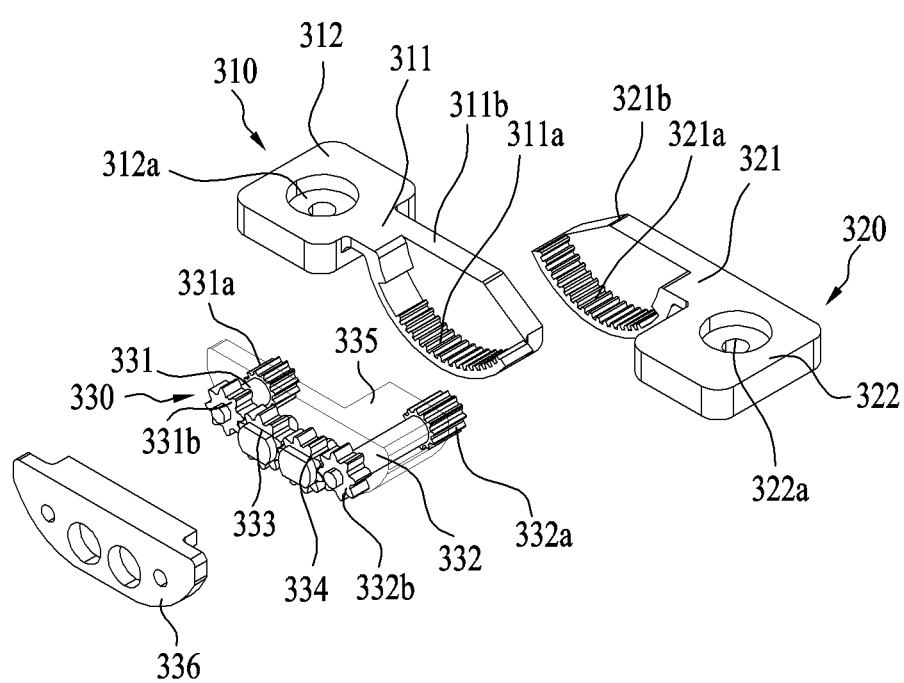
FIG. 12 is an exploded perspective view diagram showing a second hinge of a mobile terminal.
Figure 13:
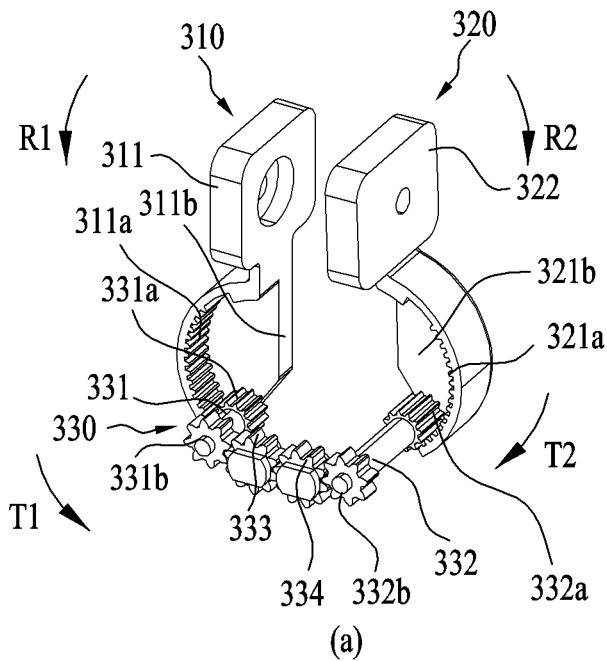
FIG. 13 includes perspective view diagrams showing folding and unfolding of a second hinge.
Figure 13:
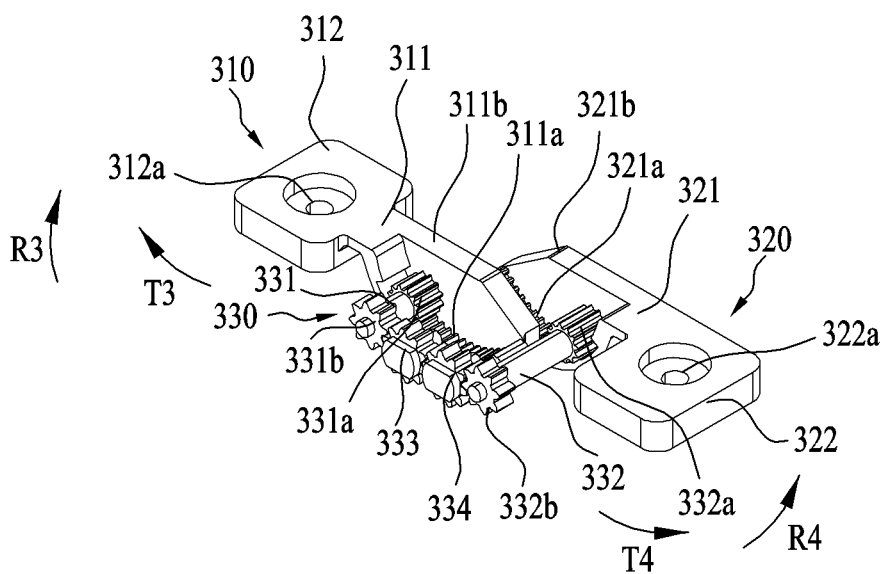

FIG. 12 is an exploded perspective view diagram showing a second hinge of a mobile terminal. FIG. 13 includes perspective view diagrams showing folding and unfolding of a second hinge. In addition, since FIGS. 6 to 11 include the disclosure related to the second hinge, they will be referred to in the following description.

Like the first hinge 200, the second hinge 300 needs to rotatably connect or couple the first and second bodies 101 and 102 together. For the smooth rotations of the first and second bodies 101 and 102, the second hinge 300 needs not to interfere with the aforementioned motion of the firs hinge 200. For this reason, the second hinge 300 basically has the structure similar to that of the first hinge 200 and may be configured to move in the similar manner.

The second hinge 300 may include a third hinge arm 310 and a fourth hinge arm 320 provided to the first body 101 and the second body 102, respectively. Like the first hinge 200, as shown in the drawings, the second hinge 300 is disposed between the first and second bodies 101 and 102, thereby connecting or coupling them together rotatably with respect to each other. Specifically, the second hinge 300 is disposed between adjacent lateral parts or side edges 101c and 102c of the first and second bodies 101 and 102 and may be configured to connect or couple them together rotatably.

The third hinge arm 310 of the second hinge 300 may be configured to be coupled to the first body 101. The third hinge arm 310 may include a body 311 and a bracket 312 provided to the body 311. The bracket 312 may be coupled to the first body 101, and more particularly, to the second surface 101b of the first body 101 to couple the third hinge arm 310 to the first body 101. Specifically, the bracket 312 may include a fastening hole 312a and may be coupled to the first body 101 using the fastening hole 312a and a fastening member. The first body 101 may further include a recess 101g additionally formed in the second surface 101b thereof, and more particularly, in the seat 101e, whereby the bracket 312 may be received in the recess 101g. Therefore, as shown in the drawings, the bracket 312 is not projected from the second surface 101b of the first body 101, and more particularly, from the seat 101e, thereby avoiding interfering with the display 151 received in the seat 101e.

The fourth hinge arm 320 may be configured to be coupled to the second body 102. Similarly to the above-described third hinge arm 310, the fourth hinge arm 320 may include a body 321 and a bracket 322 provided to the body 321. The bracket 322 may be coupled to the second body 102, and more particularly, to the second surface 102b of the second body 102 to couple the fourth hinge arm 320 to the second body 102. Specifically, the bracket 322 may include a fastening hole 322a and may be coupled to the second body 102 using the fastening hole 322a and a fastening member. The second body 102 may further include a recess 102g additionally formed in the second surface 102b thereof, and more particularly, in the seat 102e, whereby the bracket 322 may be received in the recess 102g. Therefore, as shown in the drawings, the bracket 322 is not projected from the second surface 102b of the second body 102, and more particularly, from the seat 102e, thereby avoiding interfering with the display 151 received in the seat 102e.

The body 311 of the third hinge arm 310 may include a rod member extended long from the bracket 312. Specifically, the body 311 may be extended from the bracket 312 toward the second body 102 (or the lateral part 102c thereof), and may traverse a space between the first and second bodies 101 and 102 in a horizontal direction, i.e., a lateral direction of the first and second bodies 101 and 102. Likewise, the body 321 of the fourth hinge arm 320 may include a rod member extended long from the bracket 322. The body 321 may be extended from the bracket 322 toward the first body 101 (or the lateral part 101c thereof), and may traverse a space between the first and second bodies 101 and 102 in a horizontal direction, i.e., a lateral direction of the first and second bodies 101 and 102. Theses bodies 311 and 321 may be formed separately from the brackets 312 and 322 and coupled to the brackets 312 and 322. As shown in the drawing, these bodies 311 and 321 may be integratedly formed with the brackets 312 and 322, respectively.

In addition, as shown in the drawings, the body 311 of the third hinge arm 310 may be formed in a manner of being curved or arched outwardly from the mobile terminal 100 or the first and second bodies 101 and 102. As described above, since the third hinge arm 310 is fixed to the first body 101, when the first body 101 is rotated, the third hinge arm 310 may move together and the curved body 311 thereof may revolve (or orbit or turn) around a prescribed first axis A1 like the first hinge arm 210 (i.e., the body 211). Like the first hinge arm 210, such revolution may be performed along an additional path, which is the same as the first path P1 formed around the first axis A1 in a manner of being curved, i.e., a third path. Namely, the body 311 of the third hinge 310 may revolve around the first axis A1 along the first path P1 (or the third path). Meanwhile, similarly to the third hinge arm 310, the body 321 of the fourth hinge arm 320 may be formed in a manner of being curved or arched outwardly from the mobile terminal 100 or the first and second bodies 101 and 102. Since the fourth hinge arm 320 is fixed to the second body 102, when the second body 102 is rotated, the fourth hinge arm 320 may move together and the curved body 311 thereof may revolve around a prescribed second axis A2 like the second hinge arm 220 (i.e., the body 221). Like the second hinge arm 220, such revolution may form an additional path, which is the same as the curved second path P2 formed around the second axis A2, i.e., a fourth path. Namely, the body 321 of the fourth hinge 320 may revolve around the second axis A2 along the second path P2 (or the fourth path). Thus, like the aforementioned first and second hinge arms 210 and 220, the third and fourth hinge arms 310 and 320, and more particularly, the bodies 311 and 321 thereof revolve between the first and second bodies 101 and 102, and their paths P1 and P2 (or the third and fourth paths) may not be formed long while allowing the first and second bodies 101 and 102 to rotate sufficiently. Therefore, as the third and fourth hinge arms 310 and 320 are configured to revolve around the first and second axes A1 and A2, respectively, the second hinge 300 itself may become compact, whereby the mobile terminal 100 can become compact for such a reason.

In addition, as well shown in FIG. 7 and FIG. 8 as well as FIG. 6, the third hinge arm 310, i.e., the body 311 may be spaced apart from the fourth hinge arm 320, i.e., the body 321 in a vertical direction at a prescribed interval. Hence, the third hinge arm 310, i.e., the body 311 and the fourth hinge arm 320, i.e., the body 321 may be extended in a horizontal direction, i.e., in a lateral direction of the bodies 101 and 102 in a length enough to enable rotations required for the first and second bodies 101 and 102 without interfering with each other. Specifically, owing to such sufficient extension, the third hinge arm 310, i.e., the body 311 and the fourth hinge arm 320, i.e., the body 321 may be side by side with each other in a horizontal direction but may overlap each other in a vertical direction. In addition, like the first and second hinge arms 210 and 220, owing to the overlapping between the third and fourth hinge arms 310 and 320, the first and second paths P1 and P2 (or the third and fourth paths) formed by them may be formed in sufficient lengths but may overlap each other in the vertical direction despite being side by side with each other in the horizontal direction. Owing to such disposition, even in a smaller space between the first and second bodies 101 and 102, the third and fourth hinge arms 310 and 320 may form the paths P1 and P2 (or the third and fourth paths) in sufficient lengths that meet the required rotations of the bodies 101 and 102. Therefore, the second hinge 300 may become compact while showing the required performance, whereby a size of the mobile terminal 100 including the second hinge 300 inside can be reduced.

In addition, as described above, the third and fourth hinge arms 310 and 320 may be fixed to the first and second bodies 101 and 102 and rotate together with them. On the other hand, the third and fourth hinge arms 310 and 320 may be configured to be relatively movable to perform revolving motions. Namely, like the first and second hinge arms 210 and 220, the third and fourth hinge arms 310 and 320 may be configured not to move relatively with respect to the first and second bodies 101 and 102 but to perform relative motions with respect to each other. Eventually, the third and fourth hinge arms 310 and 320 may be coupled to be relatively movable to each other only. Specifically, as well shown in FIG. 13, the third hinge arm 310 (i.e., the body 311) may be configured to move toward or away from the fourth hinge arm 320 (or the second body 102). In addition, the fourth hinge arm 320 (or the body 321) may be configured to move toward or away from the third hinge arm 310 (or the first body 101). Considering such motions, the third hinge arm 310 (i.e., the body 311) may be configured slidable in a horizontal direction with respect to the fourth hinge arm 320, and the fourth hinge arm 320 (i.e., the body 321) may be configured slidable in a horizontal direction with respect to the third hinge arm 310. Namely, the third hinge arm 310 may be slidably coupled to the fourth hinge arm 320, and the fourth hinge arm 320 may be slidably coupled to the third hinge arm 310. Eventually, such a slide motion may change a horizontal interval or distance between the third and fourth hinge arms 310 and 320 like the first and second hinge arms 210 and 220. On the other hand, by the slide motion, the overlap length of the third and fourth hinge arms, i.e., the bodies 311 and 321 thereof may be changed. When the mobile terminal 100 is unfolded by the change of the horizontal interval or overlap length, the third and fourth hinge arms 310 and 320 are fully unfolded like the first and second hinge arms 210 and 220 and may become flush with the first and second bodies 101 and 102 without being projected therefrom. In addition, the change of the horizontal interval or overlap length may allow or absorb the curvature change and deformation of the mobile terminal 100, generated from folding or unfolding the mobile terminal 100. The relation between the curvature change/deformation and the horizontal direction may cite the description of the first and second hinge arms 210 and 220 with reference to FIG. 11, and additional description will be omitted from the following. Therefore, like the first and second hinge arms 210 and 220, the third and fourth hinge arms 310 and 320 may be configured to adjust a horizontal relative distance and interval between the first and second bodies 101 and 102 according to the rotation directions of the first and second bodies 101 and 102, thereby enabling the smooth rotations of the first and second bodies 101 and 102.

In addition to the above basic configurations, the second hinge 300 may include an interlock mechanism configured to interlock the first and second bodies 101 and 102 with each other. The interlock mechanism 330 may be basically coupled to the third and fourth hinge arms 310 and 320, thereby connecting them together. In addition, the interlock mechanism 330 may interlock the third and fourth hinge arms 310 and 320 together, thereby interlocking the first and second bodies 101 and 102 coupled to the hinge arms 310 and 320 together as well.

Referring to FIGS. 7, 8, 12 and 13, in order to be coupled to the third and fourth hinge arms 310 and 320, the interlock mechanism 330 may be disposed in a space between the first and second bodies 101 and 102 (i.e., the adjacent lateral parts 101c and 102c) together with the third and fourth hinge arms 310 and 320. Specifically, the interlock mechanism 330 may be spaced apart from the third and fourth hinge arms 310 and 320 in a vertical direction. Hence, the interlock mechanism 330 may be aligned with the first to fourth hinge arms 210, 220, 310 and 320 and the supporter 230 along the vertical direction, and such disposition may be advantageous in providing the required components in the narrow space between the first and second bodies 101 and 102. The interlock mechanism 330 may be disposed at various positions in such a vertical direction or a vertical line. For example, the interlock mechanism 330 may be disposed between the third and fourth hinge arms 310 and 320. In addition, as shown in the drawing, the interlock mechanism 330 may be disposed below or above the assembly of the third and fourth hinge arms 310 and 302.

The above-configured interlock mechanism 330 may include various mechanisms to effectively interlock the third and fourth hinge arms 310 and 320. For example, as shown in the drawing, the interlock mechanism 330 may include a gear train configured to drive the third and fourth hinge arms 310 and 320 simultaneously. The interlock mechanism 330 configured as the gear train may include a first gear 331 engaging with the third hinge arm 310 and a second gear engaging with the fourth hinge arm 32. The third hinge arm 310 may include a first rack gear 311a engaging with the first gear 331, and the fourth hinge arm 320 may include a second rack gear 321a engaging with the second gear 332. The first and second rack gears 311a and 321a may convert the rotating motions of the first and second gears 311 and 312 into motions of a curved straight line type, i.e., motions according to the first and second paths P1 and P2 (or the third and fourth paths) (i.e., motions of the third and fourth hinge arms 310 and 320 coupled to the rack gears), respectively. On the contrary, the first and second rack gears 311a and 321a may convert the motions of the third and fourth hinge arms 310 and 320 according to the first and second paths P1 and P2 (or the third and fourth paths) into the rotating motions of the first and second gears 311 and 321, respectively. Specifically, the first and second rack gears 311a and 321a are formed at the third and fourth hinge arms 310 and 320, i.e., the bodies 311 and 312 thereof, and may be extended to correspond to the first and second paths P1 and P2 (or the third and fourth paths), i.e., in the same pattern or profile of the first and second paths P1 and P2 (or the third and fourth paths), respectively. Therefore, the third and fourth hinge arms 310 and 320 may be guided by the first and second rack gears 311a and 321a, thereby stably revolving around the first and second axes A1 and A2 along the first and second paths P1 and P2 (or the third and fourth paths), respectively.

More specifically, in the interlock mechanism 330, the first and second gears 331 and 332 are interlocked with other gears for the interlock of the third and fourth hinge arms 310 and 320 and, to this end, may be configured as a compound gear. The first gear 331 may include a first drive gear 331a and a first driven gear 331b, coupled to a single shaft. The second gear 332 may include a second drive gear 332a and a second driven gear 332b. coupled to a single shaft. For the interlock and synchronization of the third and fourth hinge arms 310 and 320, each of the first and second drive gears 331a and 332a may have the same number of teeth and each of the first and second driven gears 331b and 332b may have the same number of teeth. The first and second drive gears 331a and 332a may engage with the first and second rack gears 311a and 321a, respectively, and may be rotated by the revolving motions of the first and second rack gears 311a and 321a, respectively. On the contrary, the rotating motions of the first and second drive gears 331a and 332a may be converted to the revolving motions of the first and second rack gears 311a and 321a, respectively. The third and fourth hinge arms 310 and 320 may include partitions 311b and 321b provided to the bodies 311 and 321 thereof and configured to restrict the vertical movements of the first and second gears 331 and 332, respectively. The partitions 311b and 321b restrict the first and second gears 331 and 332, i.e., the first and second drive gears 331a and 332a thereof from moving in a vertical direction, thereby preventing them from being separated from the first and second rack gears 311a and 321a, respectively.

The interlock mechanism 330 may include at least one or more idle gears respectively engaging with the first and second gears 311 and 312 so as to rotate the gears 311 and 312 together. For example, the interlock mechanism 330 shown in the drawings may include two idle gears 33 and 334. To interlock the first and second gears 331 and 332 with the third and fourth hinge arms 310 and 320 engaging with the first and second gears 331 and 332, and more specifically, to synchronize their motions, the idle gears 333 and 334 are configured not to change rotations speeds or torques of the first and second gears 331 and 332, respectively. Namely, the idle gears 33 and 334 may be configured to transfer the same rotation speed and torque from one of the first gears 311 and 312 to the other. To this end, the idle gears 333 and 334 may have the same gear ratio, i.e., the same number of teeth. For the transfer or exchange of the same rotation number and torque, the idle gears 333 and 334 may engage with each other and also engage with the first and second gears 331 and 332, and more particularly, with the first and second driven gears 331b and 332b thereof, respectively, at the same time. For the same reason, the idle gears 333 and 334 and the first and second driven gears 331b and 332b ma have the same numbers of teeth, respectively.

Furthermore, as well shown in FIGS. 8, 9 and 12, the interlock mechanism 330 may include a mount 335 configured to stably support the gears 311 to 314. As shown in the drawings, since the first and second gears 311 and 312 should engage with the third and fourth hinge arms 310 and 320 spaced apart from the interlock mechanism 330, the first and second drive gears 331a and 332a of the gears 311 and 312 may be spaced apart from the first and second driven gears 331b and 332b engaging with the idle gears 333 and 334, respectively. In addition, as the fourth hinge arm 320 is located in a manner of being more distant from the interlock mechanism 330 than the third hinge arm 310, a space between the second drive gear 332a and the second driven gear 332b is greater than a space between the first drive gear 331a and the first driven gear 331b. The spaced first drive and driven gears 331a and 331b may be connected together by a single shaft so as to rotate together. As shown in the drawings, the mount 335 includes a panel member and may be configured to hold the connecting shaft of the first drive and driven gears 331a and 331b, the connecting shaft of the second drive and driven gears 332a and 332b and the rotating shafts of the idle gears 333 and 334. Specifically, the mount 335 may include openings formed in a body of the mount 335 to enable the aforementioned shafts to pass therethrough. Therefore, the gears 331 to 334 may rotate by being stably supported by the mount 335.

By the above-described configuration of the interlock mechanism, referring to FIG. 13, for example, if the first body 101 rotates in the first or third direction R1 or R3, the third hinge arm 310 and the rack gear 311a thereof may revolve in the first or third revolving direction T1 or T3, whereby owing to such revolution, the first gear, and more particularly, the first drive gear 331a thereof may be rotated by the movement of the rack gear 311a. The first drive gear 331a and the first driven gear 331b are rotated together by the connection via the shaft, whereby the sequentially engaging idle gears 333 and 334 and second driven gear/second drive gear 332b/332a may be rotated simultaneously.

By the rotation of the second drive gear 332a, the fourth hinge arm 320 and the rack gear 321a thereof are rotated in the second or fourth revolving direction T2 or T4, whereby the second body 102 may be rotated in the second or fourth direction R2 or R4. On the other hand, if the second body 102 rotates in the second or fourth direction R2 or R4, the fourth hinge arm 320 and the rack gear 321a thereof may revolve in the second or fourth revolving direction T2 or T4, whereby owing to such revolution, the second gear, and more particularly, the second drive gear 332a thereof may be rotated by the movement of the rack gear 321a. The second drive gear 332a and the second driven gear 332b are rotated together by the connection via the shaft, whereby the sequentially engaging idle gears 333 and 334 and first driven gear/first drive gear 331b/331a may be rotated simultaneously. By the rotation of the first drive gear 331a, the third hinge arm 310 and the rack gear 311a thereof are rotated in the first or third revolving direction T1 or T3, whereby the first body 101 may be rotated in the first or third direction R1 or R3. Thus, by the interlock mechanism 330, the first and second bodies 101 and 102 coupled to the third and fourth hinge arms 310 and 320 may be interlocked with each other as well as the third and fourth hinge arms 310 and 320, and motions of them 310, 320, 101 and 102 may be synchronized with each other. Namely, they may start simultaneously at least. In addition, the numbers of teeth of the first and second drive gears 331a and 332a respectively coupled to the racks 311a and 312a are equal to each other, and the idle gears 333 and 334 and the first and second driven gears 331b and 332b may have the same number of teeth. Therefore, the first and second rack gears 311a and 312a and the third and fourth hinge arms 310 and 320 coupled thereto may revolve by the same amount in the aforementioned interlock process, whereby the first and second bodies 101 and 102 coupled to the third and fourth hinge arms 310 and 320 may rotate by the same angle. Accordingly, the second hinge 300 or the interlock mechanism 330 thereof may rotate the first and second bodies 101 and 102 by the same angle simultaneously. For this reason, the second hinge 300 may substantially synchronize the motions or rotations of the first and second bodies 101 and 102, whereby the mobile terminal 100 can be folded or unfolded more smoothly and conveniently.

Figure 14:
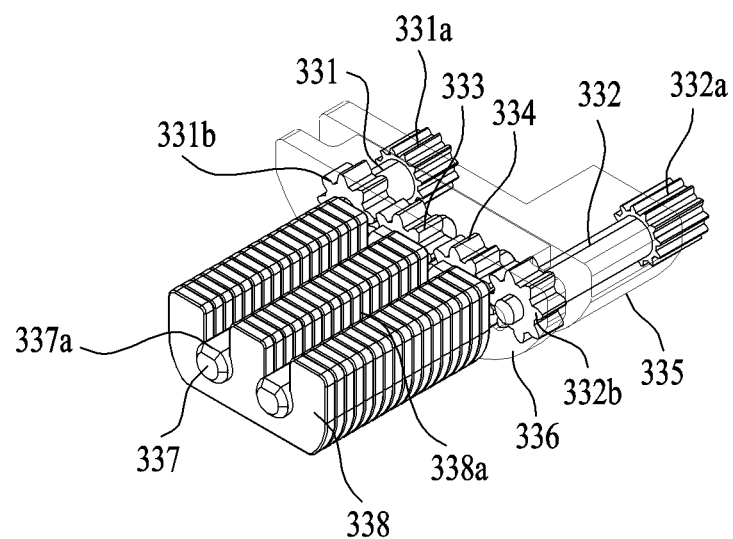
FIG. 14 and FIG. 15 are perspective and front view diagrams showing a holding mechanism of a second hinge, respectively.
Figure 15:
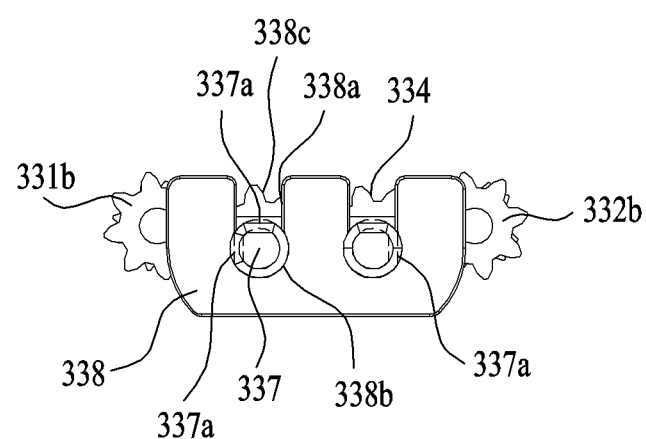
Figure 16:
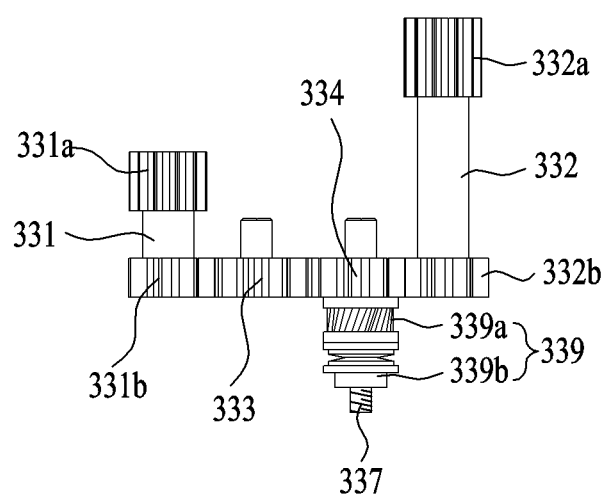
FIG. 16 is a layout showing another example of a holding mechanism of a second hinge.

The second hinge 300 may include a holder or a holding mechanism configured to maintain relative positions of the first and second bodies 101 and 102 in addition to the above-described interlock mechanism 330. FIG. 14 and FIG. 15 are perspective and front view diagrams showing a holding mechanism of a second hinge, respectively. FIG. 16 is a layout showing another example of a holding mechanism of a second hinge. In addition, as FIGS. 6 to 8 illustrate the holding mechanism, they will be referred to for the following description together with FIGS. 14 to 16.

A holding mechanism may be implemented in various ways. For example, the holding mechanism may be configured to apply a prescribed force to components for moving the bodies 101 and 102 and restrict motions of the components until a force greater than the applied force is applied to the bodies 101 and 102. For example, as shown in the drawings, the holding mechanism may be configured to apply force to rotating shafts of the gears 331 to 334 to restrict rotations thereof. For example, the holding mechanism is shown as applying to the shafts of the idle gears 333 and 334 and may apply to the shafts of the first and second gears 331 and 332. In addition, the holding mechanism may use frictional force as the force applied to the gears 333 and 334.

The holding mechanism may include extension shafts 337 extended from the shafts of the gears 333 and 334 and a friction member 338 configured to enclose the extension shafts 337. The friction member 338 may be formed of material having a high friction coefficient and apply a frictional force by contacting with the extension shafts 337 directly. Hence, the friction member 338 may restrict not only motions of the gears 333 and 334 coupled to the extension shafts 337 but also motions of the third and fourth hinge arms 310 and 320 coupled thereto and the first and second bodies. Specifically, the friction member 338 may include slots 338a receiving the extension shafts 337 therein. Each of the slots 338a may include a contact surface 338b directly contacting with the extension shaft 337 and an entrance 338c enabling the contact surface 338b to communicate with an outside of the friction member 338. The extension shaft 337 may be actually fitted into the slot 338a, i.e., the contact surface 338b through the entrance 338c. In addition, the extension shaft 337 may include a cutout 337a formed on an outer circumferential surface of the extension shaft 337 and continuously extend in a length direction. As shown in FIG. 15, when the mobile terminal 100 is in an unfolded state, the cutout 337a may confront the entrance 338c, whereby the outer circumferential surface of the extension shaft 337 may contact with the whole contact surface 338b. Therefore, the greatest frictional force is applied to the gears 333 and 334, whereby the mobile terminal 100 may maintain the unfolded state despite that a considerable external force is applied. In addition, while the mobile terminal 100 is folded or is being folded, as indicated by a dotted line in FIG. 15, the cutout 337a may confront the contact surface 338b without contacting with the contact surface 338b, whereby relatively small frictional force may be provided to the gears 333 and 334 due to the reduced contact surface. Therefore, while the mobile terminal 100 is folded or unfolded, less force may be required and the folding or unfolding of the mobile terminal 100 may be performed more smoothly. In addition, the holding mechanism or the second hinge 300 may include an auxiliary mount 336. The auxiliary mount 336 may include a panel member of a prescribed size and maybe configured to mount the holding mechanism on the interlock mechanism, i.e., the gears 331 to 334. The auxiliary mount 336 may include openings for receiving the shafts of the gears 331 to 334 therein, thereby supporting the interlock mechanism, i.e., the gears 331 to 334 more stably together with the mount 335.

On the other hand, for another example, as shown in FIG. 16, a holding mechanism 339 may include a friction member 339a installed on an extension shaft 337 and configured to move along the extension shaft 337 and a thruster 339b screw-coupled to the extension shaft 337. The thruster 339b may move along the extension shaft 337 in a different direction depending on a rotation direction by the screw coupling. Therefore, the thruster 339b may apply a frictional force in a manner of thrusting the friction member 339a to the gears 331 to 334 while moving toward the friction member 339a. In addition, the thruster 339b may reduce a frictional force applied by the friction member 339a while moving in an opposite direction.

As described above, the holding mechanism 337 to 339 applies frictional force to the gears 333 and 334, thereby restricting the movements of the gears 333 and 334. Hence, the holding mechanism 337 to 339 may be configured to hold the first and second bodies 101 and 102 at the positions to which they have moved until an external force greater than the applied frictional force is applied to the first and second bodies 101 and 102. Namely, the holding mechanism 337 to 339 may be configured to maintain a relative angle formed between the first and second bodies 101 and 102. For this reason, the mobile terminal 100 may maintain random positions of the first and second bodies 101 and 102 as well as the folded or unfolded state, thereby being usable more conveniently.

In some implementations, as described with reference to FIGS. 6 to 8, the first and second hinges 200 and 300 are coupled to the bodies 101 and 102 in the seats 101e and 102e of the first and second bodies 101 and 102, thereby being covered overall by the display 151 disposed in the seats 101e and 102e. Namely, the first and second hinges 200 and 300 may be disposed between the first and second bodies 101 and 102 to confront the backside of the display 151. The first and second hinges 200 and 300 covered by the display 151 are clearly shown in FIG. 4(a). As described above, such disposition is possible because the first and second hinges 200 and 300 have compact profiles of not being projected from the seats 101e and 102e at least when the mobile terminal 100 is unfolded. Since the first and second hinges 200 and 300 are not compact, if they are disposed to be exposed externally from the display 151, sizes of the first and second bodies 101 and 102 may increase. For this reason, such disposition of the first and second hinges 200 and 300 may considerably decrease the size of the mobile terminal 100. In addition, as well shown in FIG. 6, the mobile terminal 100 may include sets of the first and second hinges 200 and 300 disposed at upper and lower parts of the first and second bodies 101 and 102, respectively, thereby being folded or unfolded more stably and smoothly.

In some implementations, if the first and second hinges 200 and 300 are exposed externally from the mobile terminal 100, they are vulnerable to external shock or foreign substance. Hence, as shown in FIGS. 2 to 8, the mobile terminal may include a cover 400 provided between the first and second bodies 101 and 102 and configured to cover the first and second hinges 200 and 300. As swell shown in FIGS. 6 to 8, the cover 400 may be extended long along a length direction of the first and second bodies 100. Moreover, the cover 400 may include a recess 410 receiving and enclosing the first and second hinges 200 and 300, and more particularly, parts of the first and second hinges 200 and 300, e.g., the bodies 211, 221, 311 and 312. Furthermore, the cover 400 may be coupled with the supporter 230 of the first and second hinges 200 and 300 and the mounts 335 and 336, thereby being coupled to other components of the mobile terminal 100, the first and second hinges 200 and 300, and the first and second bodies 101 and 102. As shown in FIG. 2, the cover 400 may have a width enough to cover the first and second hinges 200 and 300 exposed when the mobile terminal 100 is folded. However, as described above, when the mobile terminal 100 is unfolded, relative compression and length reduction are generated from the unfolded portion. Therefore, as well shown in FIG. 8, the first and second bodies 101 and 102 may include recesses 101f and 102f extended inward from the lateral parts 101c and 102c thereof, respectively. When the mobile terminal 100 is unfolded, the cover 400 is received in the recesses 101f and 102f, and the mobile terminal 100 may be smoothly unfolded together with the cover 400 despite the relative reduction of the unfolded portion. In addition, since the cover 400 is received in the recesses 101f and 102f, as shown in FIG. 4(d), the cover 400 is not exposed externally, whereby the mobile terminal 100 may become compact and have an improved exterior.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A mobile terminal, comprising:
a first body;
a second body rotatably provided to the first body;
a display provided to surfaces of the first and second bodies confronting each other when the first and second bodies rotate, the display configured to be folded when the first and second bodies rotate toward each other, the display configured to be unfolded when the first and second bodies rotate away from each other;
a first hinge rotatably coupling the first and second bodies together and configured to revolve around first and second axes disposed between the first and second bodies; and
a second hinge rotatably coupling the first and second bodies together and configured to interlock the first and second bodies to rotate the first and second bodies together,
wherein the first hinge comprises:
a first hinge arm coupled to the first body and configured to revolve around the first axis;
a second hinge arm coupled to the second body and configured to revolve around the second axis; and
a supporter disposed between the first and second hinge arms and guiding revolutions of the first and second hinge arms,
wherein the first and second hinge arms comprise first and second pins, respectively, and
wherein the supporter comprises first and second grooves extended along revolution paths of the first and second hinge arms and receiving the first and second pins therein, respectively.

2. The mobile terminal of claim 1, wherein adjacent lateral parts of the first and second bodies are spaced apart from each other in a prescribed interval.

3. The mobile terminal of claim 2, wherein the first and second hinges are disposed between the lateral parts of the first and second bodies.

4. The mobile terminal of claim 1, wherein the first and second axes are oriented side by side with the lateral parts between the adjacent lateral parts of the first and second bodies and spaced apart from each other in a prescribed interval.

5. The mobile terminal of claim 1, wherein the first hinge arm is spaced apart from the second hinge arm in a prescribed interval.

6. The mobile terminal of claim 5, wherein the first and second hinge arms are extended in a manner of overlapping each other.

7. The mobile terminal of claim 1, wherein the first and second hinge arms are configured to adjust a horizontal relative interval between the first and second hinge arms.

8. The mobile terminal of claim 1, wherein the first hinge arm is configured to slide with respect to the second hinge arm and wherein the second hinge arm is configured to slide with respect to the second hinge.

9. The mobile terminal of claim 1, wherein the second hinge is configured to rotate the first and second bodies by a same angle simultaneously.

10. The mobile terminal of claim 1, the second hinge comprising:
a third hinge arm coupled to the first body and configured to revolve around the first axis;
a fourth hinge arm coupled to the second body and configured to revolve around the second axis; and
an interlock mechanism coupled to the third and fourth hinge arms and configured to interlock the third and fourth hinge arms with each other.

11. The mobile terminal of claim 10, wherein the interlock mechanism is disposed in a manner of being spaced apart from the third and fourth hinge arms in a vertical direction.

12. The mobile terminal of claim 10, wherein the interlock mechanism comprises a gear train connecting the third and fourth hinge arms to be driven simultaneously.

13. The mobile terminal of claim 10, the interlock mechanism comprising:
a first gear engaging with the third hinge arm;
a second gear engaging with the fourth hinge arm; and
at least one or more idle gears engaging with the first and second gears, respectively to rotate the first and second gears together.

14. The mobile terminal of claim 13, wherein the third hinge arm comprises a first rack gear engaging with the first gear and wherein the fourth hinge arm comprises a second rack gear engaging with the second gear.

15. The mobile terminal of claim 10, wherein the second hinge comprises a holding mechanism configured to maintain relative positions of the first and second bodies.

16. The mobile terminal of claim 15, wherein the holding mechanism comprises a friction member provided to the third and fourth hinge arms to apply frictional force of a prescribed size to the third and fourth hinge arms.

17. The mobile terminal of claim 1, wherein the first and second hinges are covered overall by the display.

18. The mobile terminal of claim 1, further comprising a cover provided between the first and second bodies and configured to cover the first and second hinges.

* * * * *